United States Patent
Morimoto

(10) Patent No.: US 7,165,001 B2
(45) Date of Patent: Jan. 16, 2007

(54) OPERATION TESTING METHOD, OPERATION TESTING APPARATUS AND COMPUTER READABLE INFORMATION RECORDING MEDIUM

(75) Inventor: Toshihiro Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/208,848

(22) Filed: Aug. 23, 2005

(65) Prior Publication Data

US 2006/0224346 A1 Oct. 5, 2006

(30) Foreign Application Priority Data

Mar. 29, 2005 (JP) ............................. 2005-096279

(51) Int. Cl.
*G06F 19/00* (2006.01)
(52) U.S. Cl. ............... 702/108; 702/119; 702/122; 702/123; 702/127; 702/182; 702/188
(58) Field of Classification Search ............... 702/108, 702/122, 123, 119, 127, 182, 188; 711/114; 714/718–720
See application file for complete search history.

(56) References Cited

U.S. PATENT DOCUMENTS 5,956,662 A * 9/1999 Hemker et al. ............. 702/182

FOREIGN PATENT DOCUMENTS

| JP | 8-255113 | 10/1996 |
| JP | 2001-236602 | 8/2001 |

* cited by examiner

*Primary Examiner*—Marc S. Hoff
*Assistant Examiner*—Phuong Huynh
(74) *Attorney, Agent, or Firm*—Staas & Halsey LLP

(57) ABSTRACT

A processing apparatus is caused to execute predetermined processing operation in a predetermined processing condition; a processing load factor in the apparatus is measured for when the predetermined processing operation is carried out in the apparatus; the measured load factor is compared with a predetermined target processing load factor range; the predetermined processing condition is adjusted in such a manner that the measured processing load factor may fall within the predetermined target processing load factor range; and operation verification of the apparatus is carried out in a condition where the measurement processing load factor falls within the target processing load factor. These steps are repeated while the target processing load factor range is changed in a predetermined manner.

15 Claims, 35 Drawing Sheets

| LOAD NO. | LOAD NAME | LOAD RANGE |
|---|---|---|
| 1 | HIGH LOAD | 81%~100% |
| 2 | MEDIUM-HIGH LOAD | 61%~80% |
| 3 | MEDIUM LOAD | 41%~60% |
| 4 | MEDIUM-LOW LOAD | 21%~40% |
| 5 | LOW LOAD | 0%~20% |

FIG.3A
| LOAD TYPE | LOAD VARIATION POINT | LOAD VARIATION CONTENTS |
|---|---|---|
| HIGH LOAD | HIGH LOAD (FIXED) | 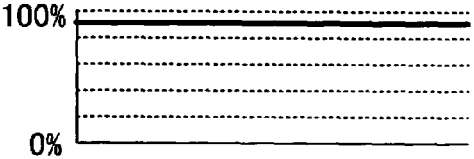 |
| | HIGH LOAD → LOW LOAD (VARIATION) | 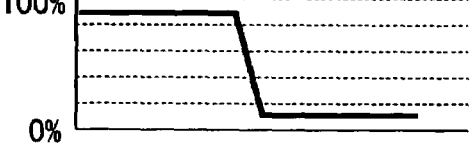 |
| | HIGH LOAD → MEDIUM-HIGH LOAD (VARIATION) | 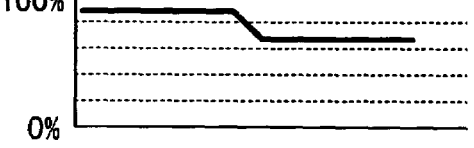 |
| | HIGH LOAD → MEDIUM LOAD (VARIATION) | 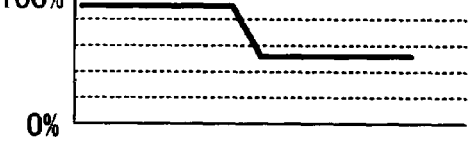 |
| | HIGH LOAD → MEDIUM-LOW LOAD (VARIATION) | 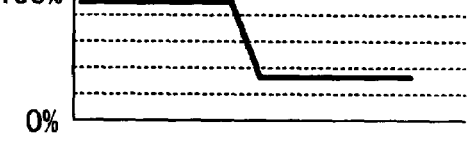 |
| | HIGH LOAD (SLIGHT VARIATION) | 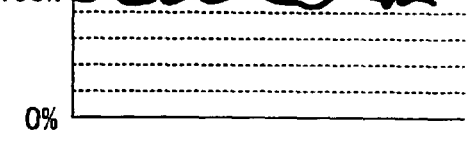 |
| MEDIUM-HIGH LOAD | MEDIUM-HIGH LOAD (FIXED) | 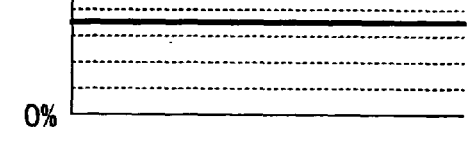 |

FIG.4

| LOAD VARIATION NO. | LOAD VARIATION POINT NAME | LOAD NO. BEFORE LOAD VARIATION | LOAD NO. AFTER LOAD VARIATION |
|---|---|---|---|
| 1 | HIGH LOAD (FIXED) | 1 | 1 |
| 2 | HIGH LOAD (SLIGHT VARIATION) | 1 | 1 |
| 3 | HIGH LOAD → MEDIUM-HIGH LOAD (VARIATION) | 1 | 2 |
| 4 | HIGH LOAD → MEDIUM LOAD (VARIATION) | 1 | 3 |
| 5 | HIGH LOAD → MEDIUM-LOW LOAD (VARIATION) | 1 | 4 |
| 6 | HIGH LOAD → LOW LOAD (VARIATION) | 1 | 5 |
| 7 | MEDIUM-HIGH LOAD (FIXED) | 2 | 2 |
| 8 | MEDIUM-HIGH LOAD (SLIGHT VARIATION) | 2 | 2 |
| 9 | MEDIUM-HIGH LOAD → HIGH LOAD (VARIATION) | 2 | 1 |
| 10 | MEDIUM-HIGH LOAD → MEDIUM LOAD (VARIATION) | 2 | 3 |
| 11 | MEDIUM-HIGH LOAD → MEDIUM-LOW LOAD (VARIATION) | 2 | 4 |
| 12 | MEDIUM-HIGH LOAD → LOW LOAD (VARIATION) | 2 | 5 |
| 13 | MEDIUM LOAD (FIXED) | 3 | 3 |
| 14 | MEDIUM LOAD (SLIGHT VARIATION) | 3 | 3 |
| 15 | MEDIUM LOAD → HIGH LOAD (VARIATION) | 3 | 1 |
| 16 | MEDIUM LOAD → MEDIUM-HIGH LOAD (VARIATION) | 3 | 2 |
| 17 | MEDIUM LOAD → MEDIUM-LOW LOAD (VARIATION) | 3 | 4 |
| 18 | MEDIUM LOAD → LOW LOAD (VARIATION) | 3 | 5 |
| 19 | MEDIUM-LOW LOAD (FIXED) | 4 | 4 |
| 20 | MEDIUM-LOW LOAD (SLIGHT VARIATION) | 4 | 4 |
| 21 | MEDIUM-LOW LOAD → HIGH LOAD (VARIATION) | 4 | 1 |
| 22 | MEDIUM-LOW LOAD → MEDIUM-HIGH LOAD (VARIATION) | 4 | 2 |
| 23 | MEDIUM-LOW LOAD → MEDIUM LOAD (VARIATION) | 4 | 3 |
| 24 | MEDIUM-LOW LOAD → LOW LOAD (VARIATION) | 4 | 5 |
| 25 | LOW LOAD (FIXED) | 5 | 5 |
| 26 | LOW LOAD (SLIGHT VARIATION) | 5 | 5 |
| 27 | LOW LOAD → HIGH LOAD (VARIATION) | 5 | 1 |
| 28 | LOW LOAD → MEDIUM-HIGH LOAD (VARIATION) | 5 | 2 |
| 29 | LOW LOAD → MEDIUM LOAD (VARIATION) | 5 | 3 |
| 30 | LOW LOAD → MEDIUM-LOW LOAD (VARIATION) | 5 | 4 |

FIG.5

| TABLE NO. | APPARATUS LOAD CONDITION VALUE | RUNNING PARAMETER NAME |
|---|---|---|
| 0 | 91%~100% | |
| 1 | 81%~90% | |
| 2 | 71%~80% | |
| 3 | 61%~70% | |
| 4 | 51%~60% | |
| 5 | 41%~50% | |
| 6 | 31%~40% | |
| 7 | 21%~30% | |
| 8 | 11%~20% | |
| 9 | 1%~10% | |
| 10 | 0% | − |

FIG.7

| TABLE NO. | SERVER INTERFACE CONTROL LOAD TYPE NO. | DISK ARRAY CONTROL LOAD TYPE NO. | DISK CONTROL LOAD TYPE NO. | RUNNING PARAMETER NAME | NUMBER OF SELECTED TIMES |
|---|---|---|---|---|---|
| 0 | 1 | 1 | 1 | | |
| 1 | 1 | 1 | 2 | | |
| 2 | 1 | 1 | 3 | | |
| 3 | 1 | 1 | 4 | | |
| 4 | 1 | 1 | 5 | | |
| 5 | 1 | 2 | 1 | | |
| 6 | 1 | 2 | 2 | | |
| .. | .. | .. | .. | | |
| 119 | 5 | 4 | 5 | | |
| 120 | 5 | 5 | 1 | | |
| 121 | 5 | 5 | 2 | | |
| 122 | 5 | 5 | 3 | | |
| 123 | 5 | 5 | 4 | | |
| 124 | 5 | 5 | 5 | | |

FIG.10

| RUNNING PARAMETER ELEMENTS | ACTUAL CONTENTS OF RUNNING PARAMETER ELEMENTS |
|---|---|
| ACCESS PATTERN | ACCESS SEQUENCE PATTERN BASED ON LBA SUCH AS SEQUENTIAL, REVERSE, RANDOM, SKIP, OR SUCH |
| ACCESS SIZE | DATA AMOUNT TRANSFERRED BY SINGLE ACCESS |
| NUMBER OF QUEUING TIMES | NUMBER OF TIMES OF QUEUING PROCESSING FOR APPARATUS |
| NUMBER OF ACCESS VOLUMES | NUMBER OF VOLUMES IN APPARATUS TO WHICH ACCESS IS MADE |
| ACCESS PATH | PARAMETER DESIGNATING PATH TO BE APPLIED FOR ACCESSING FOR CASE WHERE A PLURALITY OF ACCESS PATHS ARE AVAILABLE FOR EACH VOLUME |
| ACCESS TIMING | TIME INTERVAL FOR EXECUTING ACCESS TO APPARATUS |
| ACCESS TYPE | ACCESS TYPE FOR APPARATUS SCSI COMMAND TYPE FOR DISK ARRAY APPARATUS (WRITE, READ OR SUCH) |

FIG.16

(1) BASE PARAMETER

| RUNNING PARAMETER ELEMENTS | RUNNING PARAMETER VALUE |
|---|---|
| ACCESS PATTERN | SEQUENTIAL |
| ACCESS SIZE | 64KB |
| NUMBER OF QUEUING TIMES | 8 |
| NUMBER OF ACCESS VOLUMES | 32 |
| ACCESS PATH | PATH #0 |
| ACCESS TIMING | 0 SECOND |
| ACCESS TYPE | WRITE |

(2) RUNNING PARAMETER CHANGE

| RUNNING PARAMETER ELEMENTS | RUNNING PARAMETER VALUE |
|---|---|
| ACCESS PATTERN | SEQUENTIAL |
| ACCESS SIZE | 82KB |
| NUMBER OF QUEUING TIMES | 10 |
| NUMBER OF ACCESS VOLUMES | 32 |
| ACCESS PATH | PATH #0 |
| ACCESS TIMING | 0 SECOND |
| ACCESS TYPE | WRITE |

FIG.17

(1) TABLE INITIAL VALUE

| TABLE NUMBER | APPARATUS LOAD CONDITION VALUE | RUNNING PARAMETER NAME |
|---|---|---|
| 1 | 81%~100% | - |
| 2 | 61%~80% | - |
| 3 | 41%~60% | - |
| 4 | 21%~40% | - |
| 5 | 0%~20% | - |

(2) RUNNING PARAMETER DETERMINATION-1

| TABLE NUMBER | APPARATUS LOAD CONDITION VALUE | RUNNING PARAMETER NAME |
|---|---|---|
| 1 | 81%~100% | - |
| 2 | 61%~80% | PARAMETER-A |
| 3 | 41%~60% | - |
| 4 | 21%~40% | - |
| 5 | 0%~20% | - |

(3) DETERMINATION OF ALL RUNNING PARAMETERS

| TABLE NUMBER | APPARATUS LOAD CONDITION VALUE | RUNNING PARAMETER NAME |
|---|---|---|
| 1 | 81%~100% | PARAMETER-B, PARAMETER-C |
| 2 | 61%~80% | PARAMETER-A, PARAMETER-D |
| 3 | 41%~60% | PARAMETER-E, PARAMETER-F |
| 4 | 21%~40% | PARAMETER-G, PARAMETER-H |
| 5 | 0%~20% | PARAMETER-I, PARAMETER-J |

FIG.18

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 0 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 0 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

FIG.19

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 0 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 1 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

FIG.20

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 2 |
| 2 | HIGH LOAD (SLIGHT VARIATION) | 1 | 1 | 2 |
| 3 | HIGH LOAD → MEDIUM-HIGH LOAD (VARIATION) | 1 | 2 | 2 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 2 |
| 6 | HIGH LOAD → LOW LOAD (VARIATION) | 1 | 5 | 3 |
| 7 | MEDIUM-HIGH LOAD (FIXED) | 2 | 2 | 1 |
| 8 | MEDIUM-HIGH LOAD (SLIGHT VARIATION) | 2 | 2 | 1 |
| 9 | MEDIUM-HIGH LOAD → HIGH LOAD (VARIATION) | 2 | 1 | 1 |
| 10 | MEDIUM-HIGH LOAD → MEDIUM LOAD (VARIATION) | 2 | 3 | 1 |
| 11 | MEDIUM-HIGH LOAD → MEDIUM-LOW LOAD (VARIATION) | 2 | 4 | 2 |
| 12 | MEDIUM-HIGH LOAD → LOW LOAD (VARIATION) | 2 | 5 | 2 |
| 13 | MEDIUM LOAD (FIXED) | 3 | 3 | 1 |
| 14 | MEDIUM LOAD (SLIGHT VARIATION) | 3 | 3 | 0 |
| 15 | MEDIUM LOAD → HIGH LOAD (VARIATION) | 3 | 1 | 3 |
| 16 | MEDIUM LOAD → MEDIUM-HIGH LOAD (VARIATION) | 3 | 2 | 2 |
| 17 | MEDIUM LOAD → MEDIUM-LOW LOAD (VARIATION) | 3 | 4 | 2 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 3 |
| 21 | MEDIUM-LOW LOAD → HIGH LOAD (VARIATION) | 4 | 1 | 2 |
| 22 | MEDIUM-LOW LOAD → MEDIUM-HIGH LOAD (VARIATION) | 4 | 2 | 1 |
| 23 | MEDIUM-LOW LOAD → MEDIUM LOAD (VARIATION) | 4 | 3 | 3 |
| 24 | MEDIUM-LOW LOAD → LOW LOAD (VARIATION) | 4 | 5 | 1 |
| 25 | LOW LOAD (FIXED) | 5 | 5 | 1 |
| 26 | LOW LOAD (SLIGHT VARIATION) | 5 | 5 | 2 |
| 27 | LOW LOAD → HIGH LOAD (VARIATION) | 5 | 1 | 1 |
| 28 | LOW LOAD → MEDIUM-HIGH LOAD (VARIATION) | 5 | 2 | 2 |
| 29 | LOW LOAD → MEDIUM LOAD (VARIATION) | 5 | 3 | 3 |
| 30 | LOW LOAD → MEDIUM-LOW LOAD (VARIATION) | 5 | 4 | 3 |

FIG.21

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 2 |
| 2 | HIGH LOAD (SLIGHT VARIATION) | 1 | 1 | 2 |
| 3 | HIGH LOAD → MEDIUM-HIGH LOAD (VARIATION) | 1 | 2 | 2 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 2 |
| 6 | HIGH LOAD → LOW LOAD (VARIATION) | 1 | 5 | 3 |
| 7 | MEDIUM-HIGH LOAD (FIXED) | 2 | 2 | 1 |
| 8 | MEDIUM-HIGH LOAD (SLIGHT VARIATION) | 2 | 2 | 1 |
| 9 | MEDIUM-HIGH LOAD → HIGH LOAD (VARIATION) | 2 | 1 | 1 |
| 10 | MEDIUM-HIGH LOAD → MEDIUM LOAD (VARIATION) | 2 | 3 | 1 |
| 11 | MEDIUM-HIGH LOAD → MEDIUM-LOW LOAD (VARIATION) | 2 | 4 | 2 |
| 12 | MEDIUM-HIGH LOAD → LOW LOAD (VARIATION) | 2 | 5 | 2 |
| 13 | MEDIUM LOAD (FIXED) | 3 | 3 | 1 |
| 14 | MEDIUM LOAD (SLIGHT VARIATION) | 3 | 3 | 1 |
| 15 | MEDIUM LOAD → HIGH LOAD (VARIATION) | 3 | 1 | 3 |
| 16 | MEDIUM LOAD → MEDIUM-HIGH LOAD (VARIATION) | 3 | 2 | 2 |
| 17 | MEDIUM LOAD → MEDIUM-LOW LOAD (VARIATION) | 3 | 4 | 2 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 3 |
| 21 | MEDIUM-LOW LOAD → HIGH LOAD (VARIATION) | 4 | 1 | 2 |
| 22 | MEDIUM-LOW LOAD → MEDIUM-HIGH LOAD (VARIATION) | 4 | 2 | 1 |
| 23 | MEDIUM-LOW LOAD → MEDIUM LOAD (VARIATION) | 4 | 3 | 3 |
| 24 | MEDIUM-LOW LOAD → LOW LOAD (VARIATION) | 4 | 5 | 1 |
| 25 | LOW LOAD (FIXED) | 5 | 5 | 1 |
| 26 | LOW LOAD (SLIGHT VARIATION) | 5 | 5 | 2 |
| 27 | LOW LOAD → HIGH LOAD (VARIATION) | 5 | 1 | 1 |
| 28 | LOW LOAD → MEDIUM-HIGH LOAD (VARIATION) | 5 | 2 | 2 |
| 29 | LOW LOAD → MEDIUM LOAD (VARIATION) | 5 | 3 | 3 |
| 30 | LOW LOAD → MEDIUM-LOW LOAD (VARIATION) | 5 | 4 | 3 |

FIG.22

| TABLE NO. | SERVER INTERFACE CONTROL LOAD TYPE NO. | DISK ARRAY CONTROL LOAD TYPE NO. | DISK CONTROL LOAD TYPE NO. | VALID/ INVALID | RUNNING PARAMETER NAME | NUMBER OF SELECTED TIMES |
|---|---|---|---|---|---|---|
| 1 | 1 | 1 | 1 | – | – | 0 |
| 2 | 1 | 1 | 2 | – | – | 0 |
| 3 | 1 | 1 | 3 | – | – | 0 |
| 4 | 1 | 1 | 4 | – | – | 0 |
| 5 | 1 | 1 | 5 | – | – | 0 |
| 6 | 1 | 2 | 1 | – | – | 0 |
| 7 | 1 | 2 | 2 | – | – | 0 |
| .. | .. | .. | .. | .. | .. | .. |
| 120 | 5 | 4 | 5 | – | – | 0 |
| 121 | 5 | 5 | 1 | – | – | 0 |
| 122 | 5 | 5 | 2 | – | – | 0 |
| 123 | 5 | 5 | 3 | – | – | 0 |
| 124 | 5 | 5 | 4 | – | – | 0 |
| 125 | 5 | 5 | 5 | – | – | 0 |

FIG.23

| TABLE NO. | SERVER INTERFACE CONTROL LOAD TYPE NO. | DISK ARRAY CONTROL LOAD TYPE NO. | DISK CONTROL LOAD TYPE NO. | VALID/INVALID | RUNNING PARAMETER NAME | NUMBER OF SELECTED TIMES |
|---|---|---|---|---|---|---|
| 1 | 1 | 1 | 1 | – | – | 0 |
| 2 | 1 | 1 | 2 | VALID | PARAMETER-A | 0 |
| 3 | 1 | 1 | 3 | – | – | 0 |
| 4 | 1 | 1 | 4 | – | – | 0 |
| 5 | 1 | 1 | 5 | – | – | 0 |
| 6 | 1 | 2 | 1 | – | – | 0 |
| 7 | 1 | 2 | 2 | – | – | 0 |
| .. | .. | .. | .. | .. | .. | .. |
| 120 | 5 | 4 | 5 | – | – | 0 |
| 121 | 5 | 5 | 1 | – | – | 0 |
| 122 | 5 | 5 | 2 | – | – | 0 |
| 123 | 5 | 5 | 3 | – | – | 0 |
| 124 | 5 | 5 | 4 | – | – | 0 |
| 125 | 5 | 5 | 5 | – | – | 0 |

FIG.24

| TABLE NO. | SERVER INTERFACE CONTROL LOAD TYPE NO. | DISK ARRAY CONTROL LOAD TYPE NO. | DISK CONTROL LOAD TYPE NO. | VALID/ INVALID | RUNNING PARAMETER NAME | NUMBER OF SELECTED TIMES |
|---|---|---|---|---|---|---|
| 1 | 1 | 1 | 1 | VALID | PARAMETER-B PARAMETER-C | 0 |
| 2 | 1 | 1 | 2 | VALID | PARAMETER-A PARAMETER-D | 0 |
| 3 | 1 | 1 | 3 | VALID | PARAMETER-E PARAMETER-F | 0 |
| 4 | 1 | 1 | 4 | INVALID | – | 0 |
| 5 | 1 | 1 | 5 | INVALID | – | 0 |
| 6 | 1 | 2 | 1 | VALID | PARAMETER-G PARAMETER-I | 0 |
| 7 | 1 | 2 | 2 | VALID | PARAMETER-H PARAMETER-J | 0 |
| .. | .. | .. | .. | .. | .. | .. |
| 120 | 5 | 4 | 5 | VALID | PARAMETER-L PARAMETER-M | 0 |
| 121 | 5 | 5 | 1 | INVALID | – | 0 |
| 122 | 5 | 5 | 2 | INVALID | – | 0 |
| 123 | 5 | 5 | 3 | VALID | PARAMETER-K PARAMETER-O | 0 |
| 124 | 5 | 5 | 4 | VALID | PARAMETER-N PARAMETER-Q | 0 |
| 125 | 5 | 5 | 5 | VALID | PARAMETER-P PARAMETER-R | 0 |

FIG.25

| VARIABLE NAME | | VALUE |
|---|---|---|
| LOAD VARIATION VALID FUNCTION | | - |
| LOAD VARIATION ELEMENT TABLE SELECTED TIMES | SERVER INTERFACE CONTROL FUNCTION | 0 |
| | DISK ARRAY CONTROL FUNCTION | 0 |
| | DISK CONTROL FUNCTION | 0 |

FIG.26

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 0 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 0 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

FIG.27

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 0 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 0 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

FIG.28

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 0 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 0 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

FIG.29

| VARIABLE NAME | | VALUE |
|---|---|---|
| LOAD VARIATION VALID FUNCTION | | DISK ARRAY CONTROL FUNCTION |
| LOAD VARIATION ELEMENT TABLE SELECTED TIMES | SERVER INTERFACE CONTROL FUNCTION | 0 |
| | DISK ARRAY CONTROL FUNCTION | 1 |
| | DISK CONTROL FUNCTION | 0 |

FIG.30

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 0 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 0 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

FIG.31

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 1 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 0 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

FIG.32

| LOAD VARIATION NO. | LOAD VARIATION POINT NAME | LOAD NO. BEFORE LOAD VARIATION | LOAD NO. AFTER LOAD VARIATION | NUMBER OF SELECTED TIMES |
|---|---|---|---|---|
| 1 | HIGH LOAD (FIXED) | 1 | 1 | 0 |
| 2 | HIGH LOAD (SLIGHT VARIATION) | 1 | 1 | 0 |
| 3 | HIGH LOAD → MEDIUM-HIGH LOAD (VARIATION) | 1 | 2 | 0 |
| 4 | HIGH LOAD → MEDIUM LOAD (VARIATION) | 1 | 3 | 0 |
| 5 | HIGH LOAD → MEDIUM-LOW LOAD (VARIATION) | 1 | 4 | 0 |
| 6 | HIGH LOAD → LOW LOAD (VARIATION) | 1 | 5 | 0 |
| 7 | MEDIUM-HIGH LOAD (FIXED) | 2 | 2 | 0 |
| 8 | MEDIUM-HIGH LOAD (SLIGHT VARIATION) | 2 | 2 | 0 |
| 9 | MEDIUM-HIGH LOAD → HIGH LOAD (VARIATION) | 2 | 1 | 0 |
| 10 | MEDIUM-HIGH LOAD → MEDIUM LOAD (VARIATION) | 2 | 3 | 0 |
| 11 | MEDIUM-HIGH LOAD → MEDIUM-LOW LOAD (VARIATION) | 2 | 4 | 0 |
| 12 | MEDIUM-HIGH LOAD → LOW LOAD (VARIATION) | 2 | 5 | 0 |
| 13 | MEDIUM LOAD (FIXED) | 3 | 3 | 0 |
| 14 | MEDIUM LOAD (SLIGHT VARIATION) | 3 | 3 | 0 |
| 15 | MEDIUM LOAD → HIGH LOAD (VARIATION) | 3 | 1 | 0 |
| 16 | MEDIUM LOAD → MEDIUM-HIGH LOAD (VARIATION) | 3 | 2 | 0 |
| 17 | MEDIUM LOAD → MEDIUM-LOW LOAD (VARIATION) | 3 | 4 | 0 |
| 18 | MEDIUM LOAD → LOW LOAD (VARIATION) | 3 | 5 | 0 |
| 19 | MEDIUM-LOW LOAD (FIXED) | 4 | 4 | 0 |
| 20 | MEDIUM-LOW LOAD (SLIGHT VARIATION) | 4 | 4 | 0 |
| 21 | MEDIUM-LOW LOAD → HIGH LOAD (VARIATION) | 4 | 1 | 0 |
| 22 | MEDIUM-LOW LOAD → MEDIUM-HIGH LOAD (VARIATION) | 4 | 2 | 0 |
| 23 | MEDIUM-LOW LOAD → MEDIUM LOAD (VARIATION) | 4 | 3 | 0 |
| 24 | MEDIUM-LOW LOAD → LOW LOAD (VARIATION) | 4 | 5 | 0 |
| 25 | LOW LOAD (FIXED) | 5 | 5 | 0 |
| 26 | LOW LOAD (SLIGHT VARIATION) | 5 | 5 | 0 |
| 27 | LOW LOAD → HIGH LOAD (VARIATION) | 5 | 1 | 0 |
| 28 | LOW LOAD → MEDIUM-HIGH LOAD (VARIATION) | 5 | 2 | 0 |
| 29 | LOW LOAD → MEDIUM LOAD (VARIATION) | 5 | 3 | 0 |
| 30 | LOW LOAD → MEDIUM-LOW LOAD (VARIATION) | 5 | 4 | 0 |

# OPERATION TESTING METHOD, OPERATION TESTING APPARATUS AND COMPUTER READABLE INFORMATION RECORDING MEDIUM

BACKGROUND OF THE INVENTION

1. Field of the Invention

The present invention relates to an operation testing method, an operation testing apparatus and a computer readable information recording medium, and, in particular, to an operation testing method for carrying out an operation test of a processing apparatus for which various processing load situations are assumed, an operation testing apparatus for automatically executing the operation testing method, and a computer readable information recording medium in which a program for causing a computer to execute the operation testing method is stored.

2. Description of the Related Art

For example, as a method to verify operation of a disk array apparatus having a plurality of magnetic disk apparatuses and having a function of managing storage areas thereof in an integrated manner, a so-called running test in which a processing load condition of the apparatus running is changed is carried out.

The running test of the disk array apparatus is executed in a condition in which a server which accesses the disk array apparatus is connected to the disk array apparatus via a data transfer channel. In such a case, the server's information processing performance and a data transfer rate of the data transfer channel has been increasing from year to year. Further, information processing speed of the disk array apparatus to be tested has been increasing, and also, data channels or control functions of the disk array apparatus has been becoming complicated.

In the related art, a running test for a disk array apparatus is carried out directed to increasing a load applied thereto. Further, an operation verification environment changes year to year, and a verification operator should make adjustment of running parameters manually for achieving a heavy load condition.

FIG. 1 shows one example of a system configuration for carrying out such a running test in the related art.

As shown, when a running test is carried out on a disk array apparatus 1100 including a plurality of magnetic disk apparatuses 1121 through 1124, a server 1200 which actually carries out access operation to the disk array apparatus 1100 is connected via a data transfer channel. Then, a verification operator sets predetermined running parameters, and therewith, the server 1200 carries out access operation to a controller 1110 of the disk array apparatus 1100 with the running parameters.

The controller 1110 of the disk array apparatus 1100 responds to the access operation from the server 1200 and carries out access operation to the respective magnetic disk apparatuses 1121 through 1124. Then, the verification operator monitors operation of the disk array apparatus 1100 via the server 1200, and adjusts a processing load condition of the disk array apparatus 1100 by changing the running parameters to be applied, appropriately.

Japanese Laid-open Patent Applications Nos. 2001-236602 and 8-255113 disclose the related arts of the present invention.

SUMMARY OF THE INVENTION

Upon carrying out a running test as mentioned above, since operation verification is made directed to a high load condition while data transfer channels and/or control functions are complicated in the disk array apparatus, a fixed load condition is kept in the disk array apparatus, and operation verification in a condition varying point is not carried out in the related art.

Therefore, it is difficult to find out a possibility of an actual trouble such as a contradiction in updating of a processing table managed by a firmware of the apparatus, a contradiction in a processing order in a resource conflict for various resources or such.

Further, since the apparatus is caused to operate in a fixed load condition, merely part of complicated data channels and control functions can be verified. Therefore, it is difficult to find out a possibility of a trouble such as a response delay in communication control among functions which the apparatus has.

The present invention has been devised in consideration of the above-mentioned situation, and an object of the present invention is to provide an operation testing method by which, even in a situation in which a data processing rate and a data transfer rate increases, and data channels and control functions in a disk array apparatus are complicated, assumable operation conditions in an apparatus to verify can be exhaustively carried out so that verification omission can be avoided, and thereby, a problematic situation in which a trouble may occur actually in a commercial operation can be positively avoided.

Further, another object of the present invention is to provide an operation testing method by which running parameters can be combined in various ways so that a possibility of processing table updating contradiction, processing sequence contradiction in a various resource conflict or such, which may otherwise occur in various processing load conditions can be found out.

In order to achieve these objects, according to the present invention, a processing operation execution step of causing a processing apparatus to be tested to execute predetermined processing operation in a predetermined processing condition; a processing load factor measurement step of measuring a processing load factor in the apparatus for when the predetermined processing operation is carried out in the apparatus; a processing load factor comparison step of comparing the measured load factor with a predetermined target processing load factor range; a processing condition adjustment step of adjusting the predetermined processing condition in such a manner that the measured processing load factor may fall within the predetermined target processing load factor range; and an operation verification step of carrying out operation verification of the apparatus in a condition where the measurement processing load factor falls within the target processing load factor, and wherein: the processing operation execution step, the processing load factor measurement step, the processing load factor comparison step, the processing condition adjustment step, and the operation verification step are repeated while the target processing load factor range is changed in a predetermined manner.

Thus, a predetermined processing condition is automatically adjusted so that a measured processing load factor may fall within the target processing load factor range, and thus, a desired processing load condition is achieved. Then, the target processing load factor range is changed in various manners, and the automatic adjustment is carried out each time of the processing load condition transition. As a result, various transitions of processing load conditions assumable for commercial operation can be realized within a test, verification omission can be thus avoided, and a problematic situation in which a trouble actually occurs in a commercial operation can be positively avoided.

Further, the processing operation execution step, the processing load factor measurement step, the processing load factor comparison step, the processing condition adjustment step, and the operation verification step are repeated while the predetermined target processing load factor range may be preferably changed in a predetermined manner for each function element of a plurality of functions which the processing apparatus has.

By carrying out testing operation while the target processing load factor range is changed for each function element of various functions of the processing apparatus, a possibility of a trouble which may occur due to a relationship between the respective functions can be positively found out. As a result, verification omission can be avoided, and a problematic situation in which a trouble actually occurs in a commercial operation can be positively avoided.

Thus, according to the present invention, operation verification can be carried out in a condition in which situations assumable for a commercial operation are exhaustively carried out. Thereby, it is possible to achieve an effective and efficient operation test.

BRIEF DESCRIPTION OF THE DRAWINGS

Other objects and further features of the present invention will become more apparent from the following detailed description when read in conjunction with the accompanying drawings:

FIGS. 3A, 3B, 3C and 3D illustrate load variation elements;

FIG. 4 shows a load variation element table;

FIG. 5 shows a load type and running parameter correspondence table;

FIG. 7 illustrates a function load type correlation table;

FIG. 10 shows examples of running parameters;

FIG. 16 shows a change of the running parameters in the operation test of a disk array apparatus in the embodiments of the present invention;

FIG. 17 shows a change of a load type and running parameter correspondence table in the operation test of a disk array apparatus in the embodiments of the present invention;

FIG. 18 shows an initial state of a load variation element table in the operation test of a disk array apparatus in the embodiments of the present invention;

FIG. 19 shows a load variation element table in a state after a change, in the operation test of a disk array apparatus in the embodiments of the present invention;

FIGS. 20 and 21 illustrate a case where adjustment of selected times in the load variation element table is required in the operation test of a disk array apparatus in the embodiments of the present invention;

FIG. 22 shows an initial state of the function load type correlation table in the operation test of a disk array apparatus in the second embodiment of the present invention;

FIG. 23 shows a state after adjustment of the function load type correlation table in the operation test of a disk array apparatus in the second embodiment of the present invention;

FIG. 24 shows a state in which all the parameters have been determined in the function load type correlation table in the operation test of the disk array apparatus in the second embodiment of the present invention;

FIG. 25 shows an initial state of a load table for each function in the operation test of the disk array apparatus in the second embodiment of the present invention;

FIG. 26 shows a server interface control function load variation element table in the operation test of the disk array apparatus in the second embodiment of the present invention;

FIG. 27 shows a disk array control function load variation element table in the operation test of the disk array apparatus in the second embodiment of the present invention;

FIG. 28 shows a disk control function load variation element table in the operation test of the disk array apparatus in the second embodiment of the present invention;

FIG. 29 shows the load table for each function in a state after a change in the operation test of the disk array apparatus in the second embodiment of the present invention;

FIG. 30 shows the server interface control function load variation element table in a state after a change in the operation test of the disk array apparatus in the second embodiment of the present invention;

FIG. 31 shows the disk array control function load variation element table in a state after a change in the operation test of the disk array apparatus in the second embodiment of the present invention;

FIG. 32 shows the disk control function load variation element table in a state after a change in the operation test of the disk array apparatus in the second embodiment of the present invention.

DETAILED DESCRIPTION OF THE PREFERRED EMBODIMENTS

In embodiments of the present invention, a factor of load variation is focused in order to solve the problem in the related art that operation verification for a variation point cannot be carried out since a load is constant in a disk array apparatus for which operation verification is to be carried out.

Figures 1, 2:
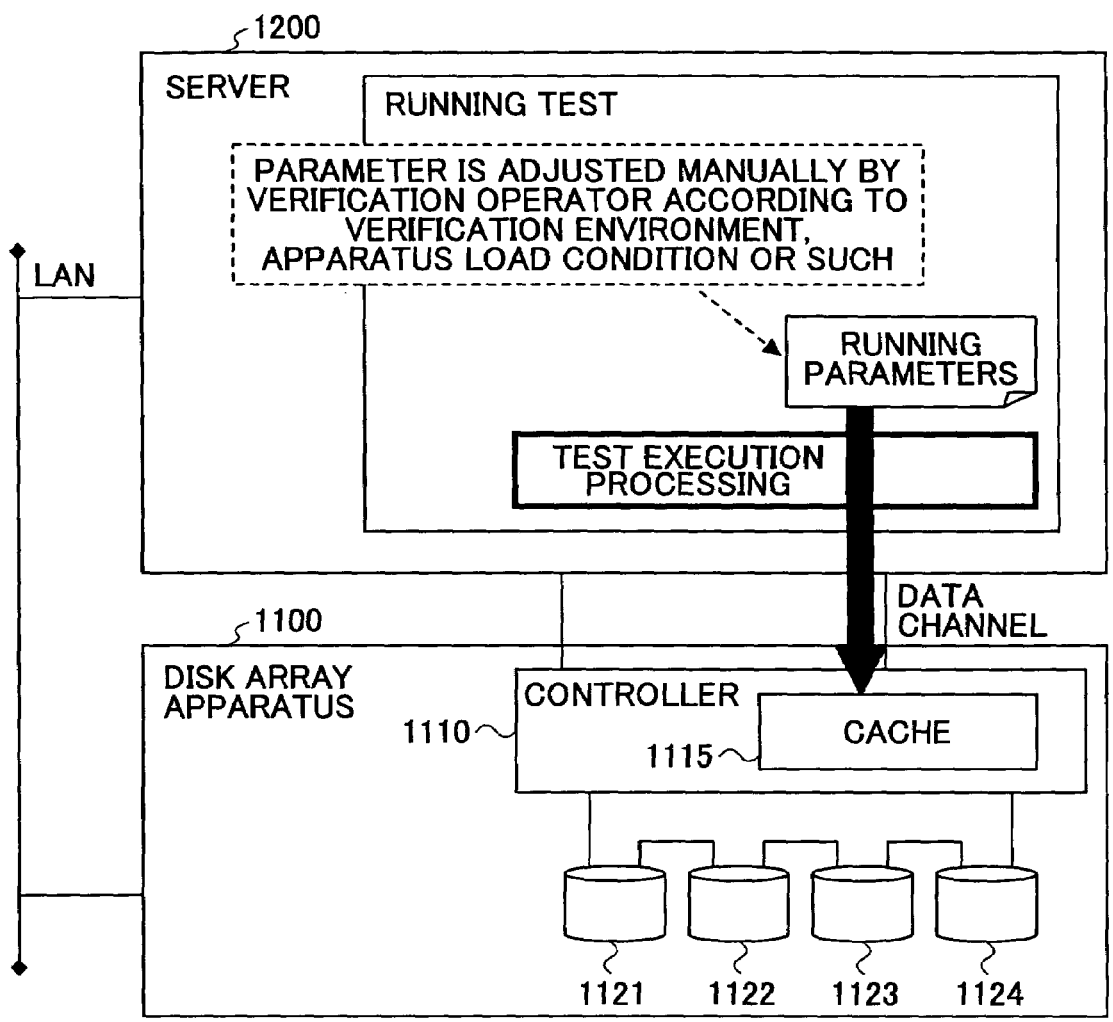
FIG. 1 illustrates an operation test of a disk array apparatus in one example of the related art.
FIG. 2 illustrates load types.
Figure 3B:
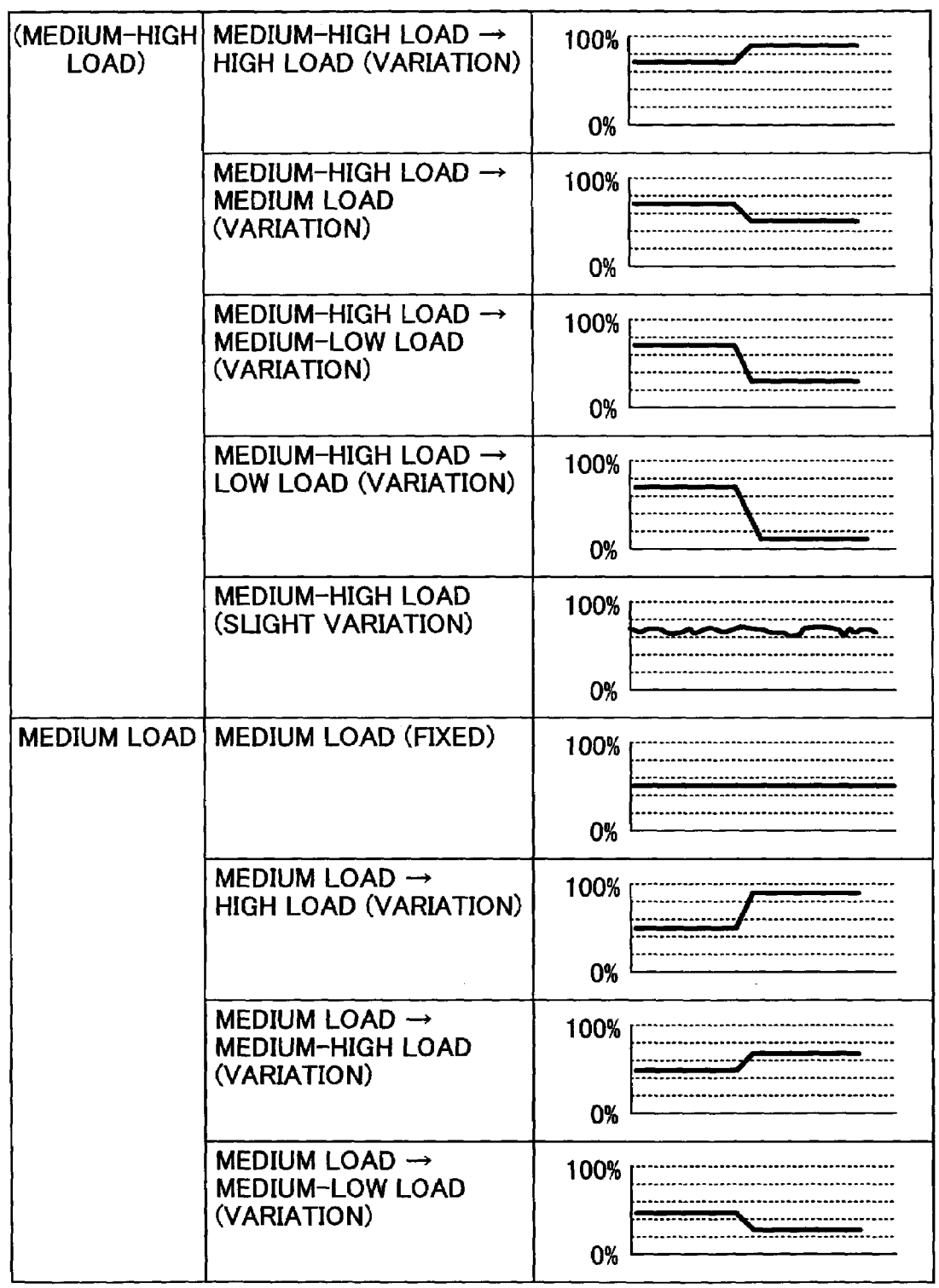
Figure 3C:
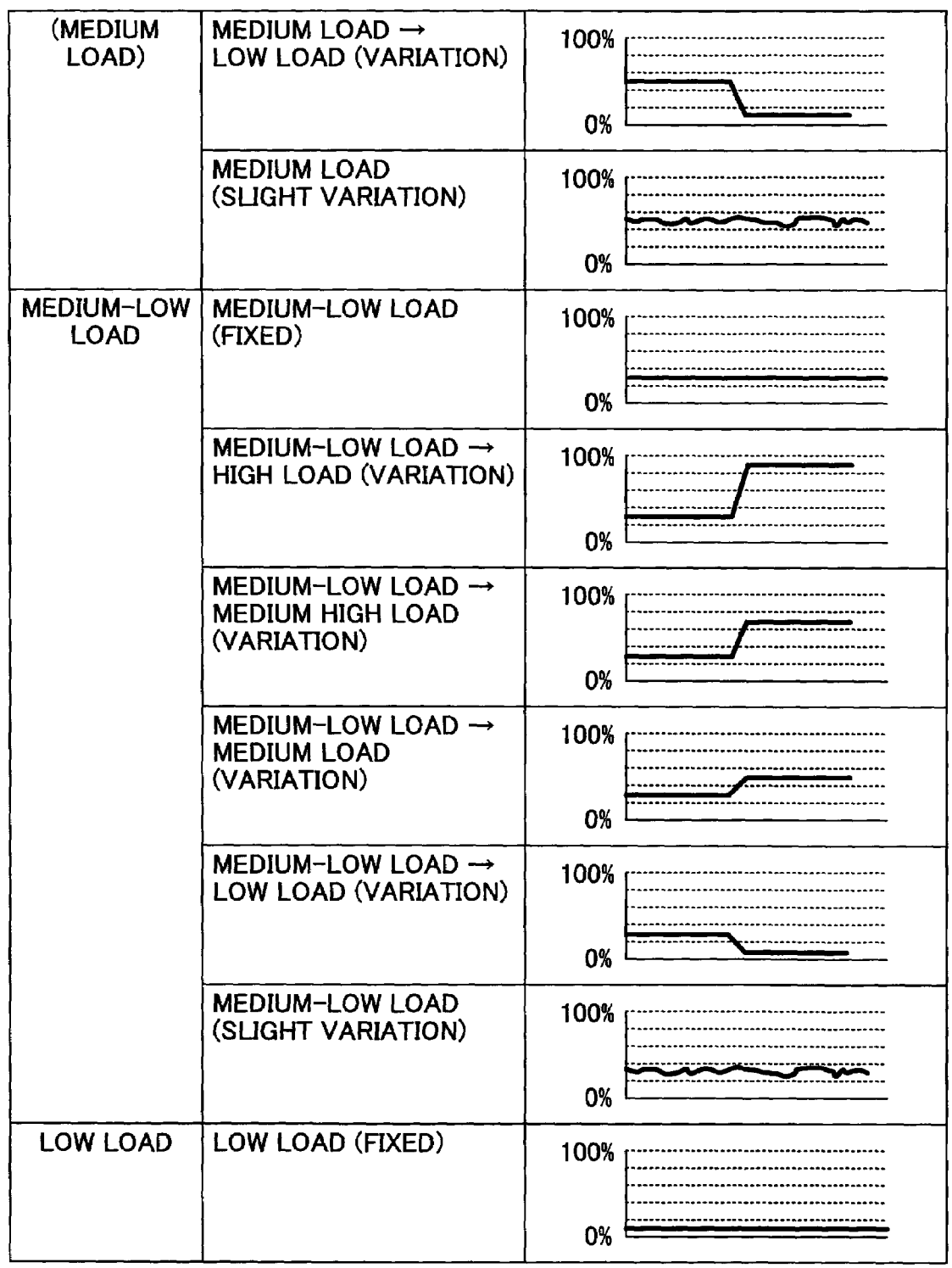
Figure 3D:
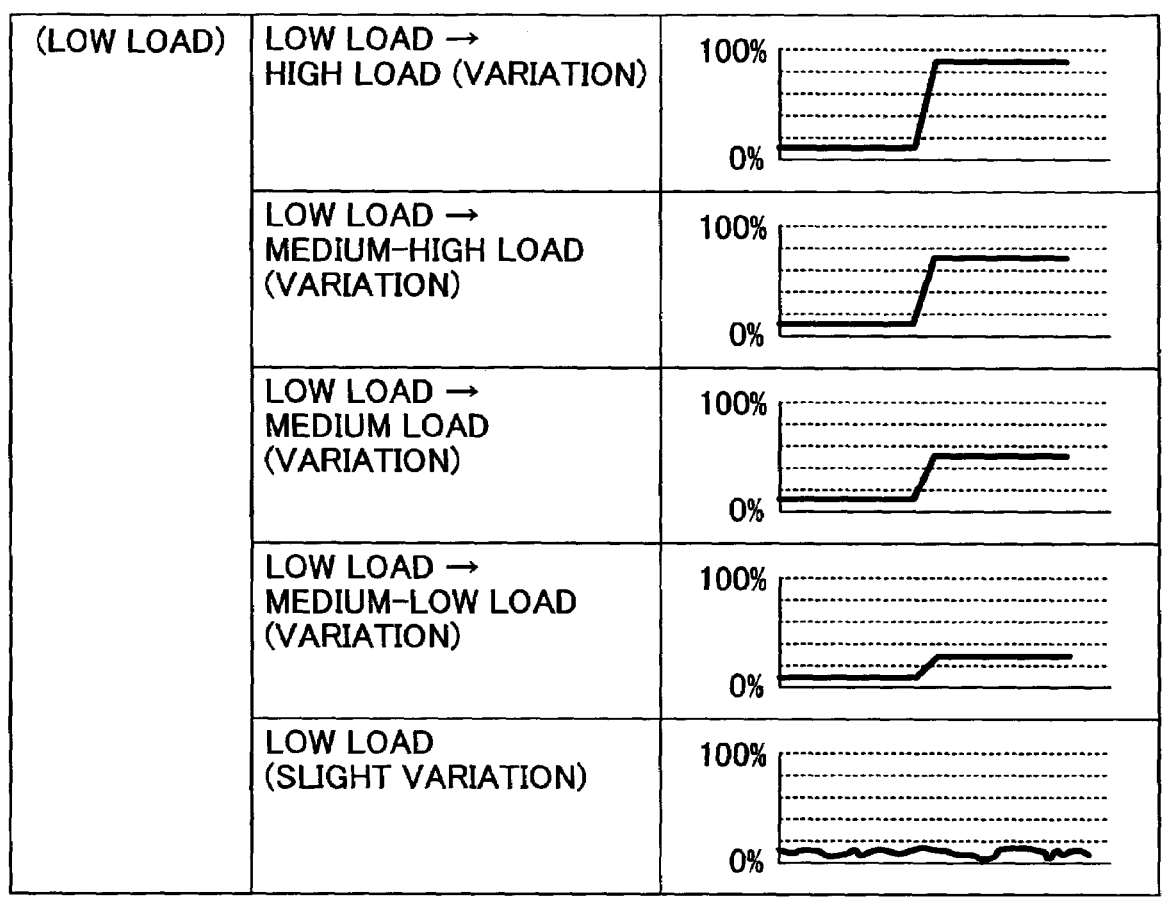

As one example of a range of load variation, five types of elements (referred to as 'load types', hereinafter) are set as shown in FIG. 2, and load variation point is obtained from a combination thereof.

FIGS. 3A through 3D list load variation elements as load variation patterns obtained from combinations of these elements.

In order to achieve these load variation elements, a 'load variation element table' in which information indicating load levels before load variation and load levels after load variation are stored is provided, as shown in FIG. 4. In this table, LOAD NO. means LOAD NO. shown in FIG. 2.

A specific procedure of an operation testing method as one embodiment of the present invention is described briefly below.

(1) Running parameters corresponding to a load type is determined, and a 'load type and running parameter correspondence table' such as that shown in FIG. 5 is produced. In this occasion, as shown, further fine load types may be applied with respect to the load types shown in FIG. 2. As a result, verification operation may be carried out precisely for various processing load conditions assumable for a commercial operation.

(2) A load type at a time of test beginning is determined from a random manner or an arbitrary selection by a verification operator.

(3) With reference to the 'load type and running parameter correspondence table', running parameters corresponding to the thus-determined load type are actually applied, and a disk array apparatus is operated. Thus, a running test is carried out.

(4) After a fixed time interval has elapsed (a specific time may be randomly determined, or may be designated by the verification operator) while the above-mentioned running test operation has been continued until then, a load variation number having a 'load number before variation' corresponding to the current load type is randomly selected from the 'load variation element table' shown in FIG. 4.

At this occasion, an experience of the number of selected times of the load variation element is recorded in the table so as to avoid a deviation otherwise occurring in selections of the load variation elements. Then, a difference in the number of selected times is obtained among the respective load variation elements selected and thus actually applied for processing load measurement. Then, when the thus-obtained difference exceeds a predetermined permissible selection deviation value, the load variation element having a less number of selected times should be applied with a higher priority. As a result, a deviation in the number of times of being applied in the test operation among the respective load variation elements can be eliminated.

(5) The load number after load variation in the load variation number thus selected in the load variation element table shown in FIG. 4 is referred to, and running of the disk array apparatus is switched so that the running parameters corresponding to the load type of the relevant load number may be applied next.

(6) The above-mentioned steps (4) through (5) are repetitively carried out, and thus, load variation running test operation is carried out.

Next, an operation testing method in a second embodiment of the present invention is described briefly.

Figure 6:
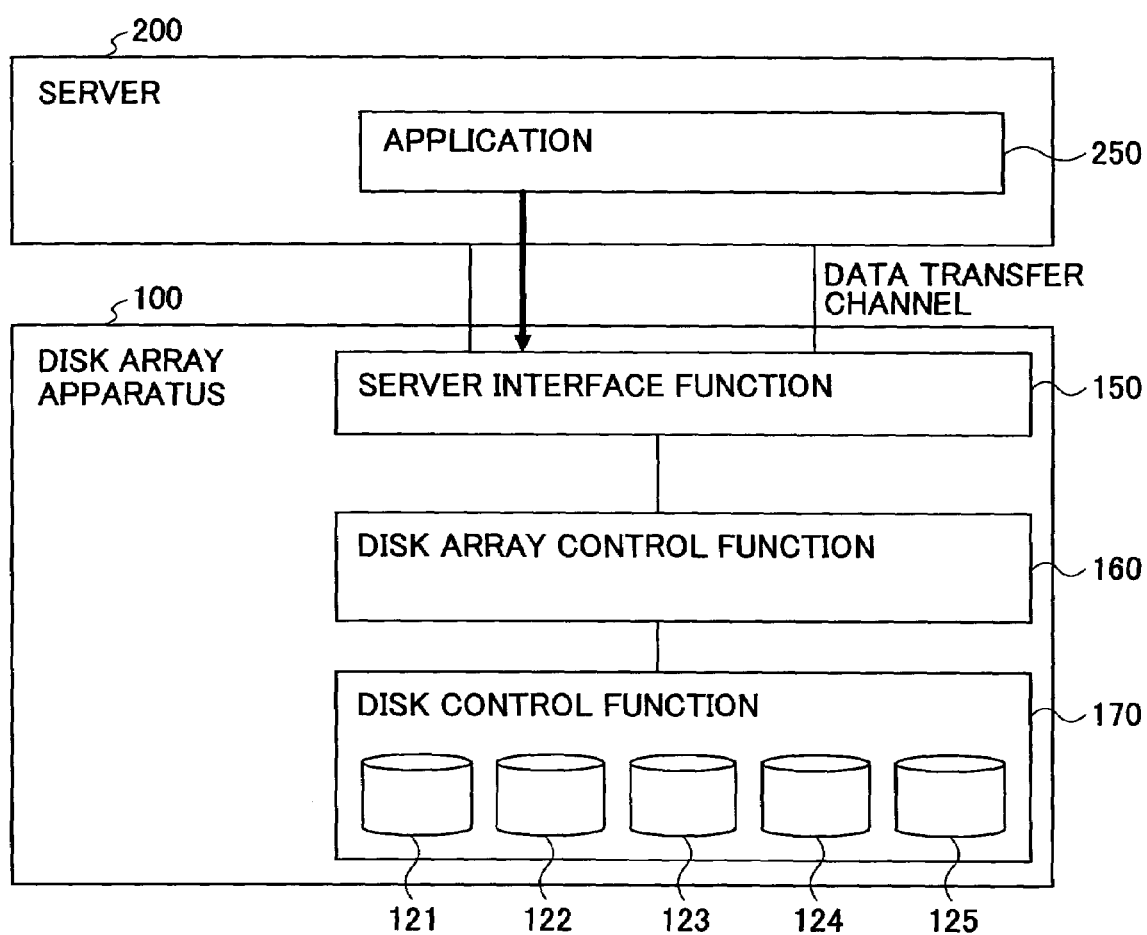
FIG. 6 illustrates function elements of a disk array apparatus.

For example, as functions of a disk array apparatus, as shown in FIG. 6, a sever interface control function 150, a disk array control function 160 and a data storage disk control function may be listed.

The server interface control function 150 is described first. A predetermined application software 250 is executed in a server 200, and as a result, access operation is carried out on a disk array apparatus 100. In this occasion, by applying a cache memory 115 or such, efficient acquisition of read data may be carried out. Thus, by means of the server interface control function 150, efficiency in information/data exchange between the server 200 and a controller of the disk array apparatus 100 can be improved, and thereby, smooth access operation in the disk array apparatus 100 by the server 200 can be achieved.

The disk array control function 160 is a function by which the disk array apparatus 100 responds to the access operation from the server 200, and then carries out access operation on the respective disk apparatuses 121 through 125, storage areas of which are managed by the controller 110 of the disk array apparatus 100, for the purpose of achieving relevant data processing. In the respective magnetic disk apparatuses 121 through 125, relevant data writing/reading processing is carried out on their own recording media, by means of the disk control functions 170, respectively.

In an operation test in the related art, a processing load for a disk array apparatus is made constant, and a verification focusing a difference in a load for each function unit or among respective functions is not carried out. In order to solve this problem, according to the second embodiment of the present invention, in order to change a processing load for each function unit or change a difference among respective functions, according to the load types shown in FIG. 2, for example, the 'function load type correlation table' is provided. Further, the 'load variation element table' shown in FIG. 4 is provided, for each function unit.

A specific procedure of an operation testing method in the second embodiment of the present invention is described below briefly.

(1) Combinations in target load condition values among the respective functions are set, and also, running parameters are determined for each of these combinations. Thus, the function load type correlation table' shown in FIG. 7 is produced. In FIG. 7, LOAD NO. means LOAD NO. of FIG. 2.

In the occasion of producing this table, a combination of load types which cannot be realized in a mutual relationship among the respective functions may occur. In such a case, a relevant table No. is determined invalid, and the relevant combination is excluded from being actually applied.

(2) A function for which load variation is made to occur (load variation valid function) when a test is started and a load type thereof are determined randomly or by a selection of a verification operator.

(3) The function load type correlation table shown in FIG. 7 is referred to, and a table number having an element according to the thus-determined load variation valid function and load type is randomly selected therefrom.

In this occasion, in order to prevent a deviation from occurring in the selection of the table number, the number of selected times is recorded for a load type combination for each function. Then, when a difference between the respective numbers of selected times exceeds a predetermined permissible selection deviation value, a load variation element having a less number of selected times should be selected with a higher priority.

(4) With the use of running parameters corresponding to the selected table number, running test operation is started.

(5) After a fixed time interval has elapsed (a specific time may be randomly determined, or may be designated by the verification operator) while the above-mentioned running test operation has been continued until then, a load variation number having a 'load number before variation' equal to the current load type is randomly selected from the 'load variation element table' shown in FIG. 4, for the load variation valid function.

Also in this occasion, in order to prevent a deviation from occurring in the selection of the load variation element, the number of selected times of the load variation element is recorded. Then, when the difference in the number of selected times among the respective load variation elements exceeds a predetermined permissible selection deviation value, the load variation element having the less number of selected times should be selected at a higher priority.

(6) The 'load number after load variation' in the thus-selected load variation number in the load variation element table of FIG. 4 is referred to, and the running parameters of the load typed corresponding to the 'load number after load variation' are determined from the correspondence table number of FIG. 5, and the running condition is switched thereto.

(7) After verification test focused on the specific function is thus carried out, a specific function for which load variation is carried out subsequently (load variation valid function) is randomly determined.

In this occasion, when a difference in the total numbers of the selected times of the load variation element tables for the respective functions (i.e., the function elements for each of which load variation is applied) exceeds a predetermined permissible selection deviation value, the function element having the less number of selected times should be selected to be applied with a higher priority.

(8) The above-mentioned steps (5) through (7) are repeated, and thus, load variation running test operation is carried out.

According to the first embodiment described above, the relevant procedure can be made in a form of a program, and therewith can be made to be carried out by a computer, and thereby, load variations can be exhaustively carried out on the relevant disk array apparatus to verify automatically. Accordingly, operation verification for respective apparatus load condition variation points can be carried out easily and positively.

According to the second embodiment described above, load variation focused on a specific functional part of the disk array apparatus to verify can be carried out, and thus, operation verification even for a state transition for each function can be exhaustively carried out. As a result, the verification range can be widened, a possibility of a trouble occurring upon a state transition for each function unit, which cannot be detected in a verification with a constant load in the related art can be positively detected, and thus, further improvement in a product quality/reliability can be achieved.

With reference to figures, an operation testing method and an operation testing apparatus according to the first embodiment of the present invention is described in further detail.

Figure 8:
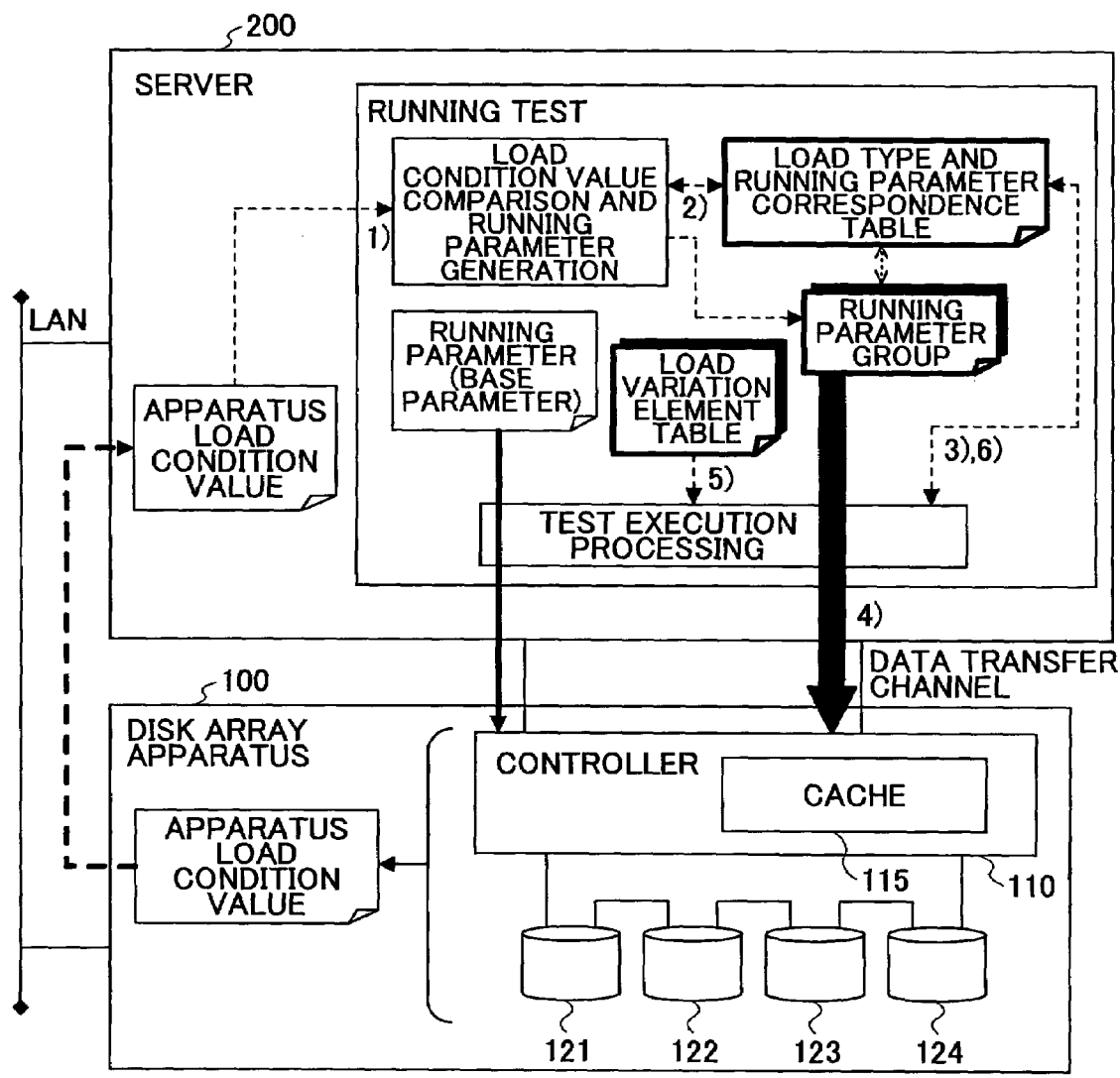
FIG. 8 illustrates an operation test of a disk array apparatus according to a first embodiment of the present invention.

FIG. 8 shows a block diagram illustrating the operation testing method and the operation testing apparatus in the first embodiment.

As shown in FIG. 8, a server 200 as an operation testing apparatus carries out access operation to a controller 110 of a disk array apparatus 100 according to running parameters defining operation condition of the disk array apparatus 100 to verify. The disk array apparatus 100 responds thereto, and causes magnetic disk apparatuses 121 through 124, storage areas of which are managed by the controller 110, to carry out relevant data processing.

During the processing, the disk array apparatus 100 obtains apparatus load condition values indicating processing loads concerning the above-mentioned interface control function 150 for an interface with the server 200, the disk array apparatus 100, disk array control function 160 and disk control function 170 and so forth. Then, the disk array apparatus 100 sends the thus-obtained values to the server 200 as a feedback signal via a LAN.

The server 200 receives the values, compares them with predetermined target values, and, when the obtained values deviate from the target values, the server 200 automatically adjust the above-mentioned running parameters so that the obtained values may fall within the target values. By thus adjusting the running parameters, the server 200 controls the disk array apparatus 100 so that the disk array apparatus 100 may run in a predetermined processing load condition. Then, the server 200 verifies that the disk array apparatus 100 can carry out predetermined operation under the condition where the disk array apparatus 100 runs in the predetermined processing load condition.

As shown in FIG. 8, this verification operation is carried out in a condition in which the disk array apparatus 100 is connected with the server 200 acting as an operation verification apparatus. However, a specific type of the interface between the server 200 and the disk array apparatus 100 via which the apparatus load condition values are transferred is not limited. In the embodiment, a connection form employing a LAN is assumed for this purpose as mentioned above.

Figure 11:
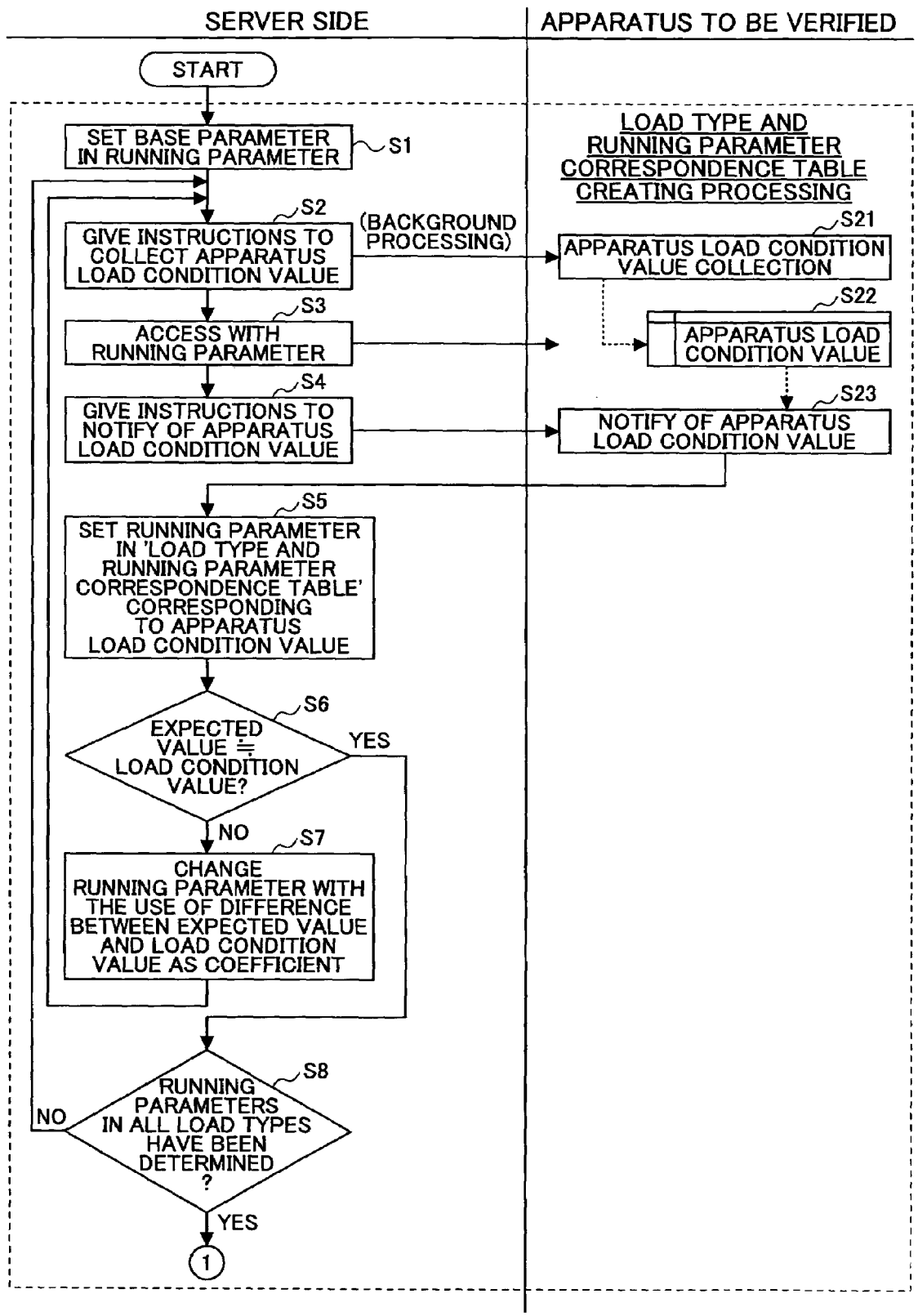
FIGS. 11 and 12 show an operation flow chart of the operation test of a disk array apparatus according to the first embodiment of the present invention.
Figure 12:
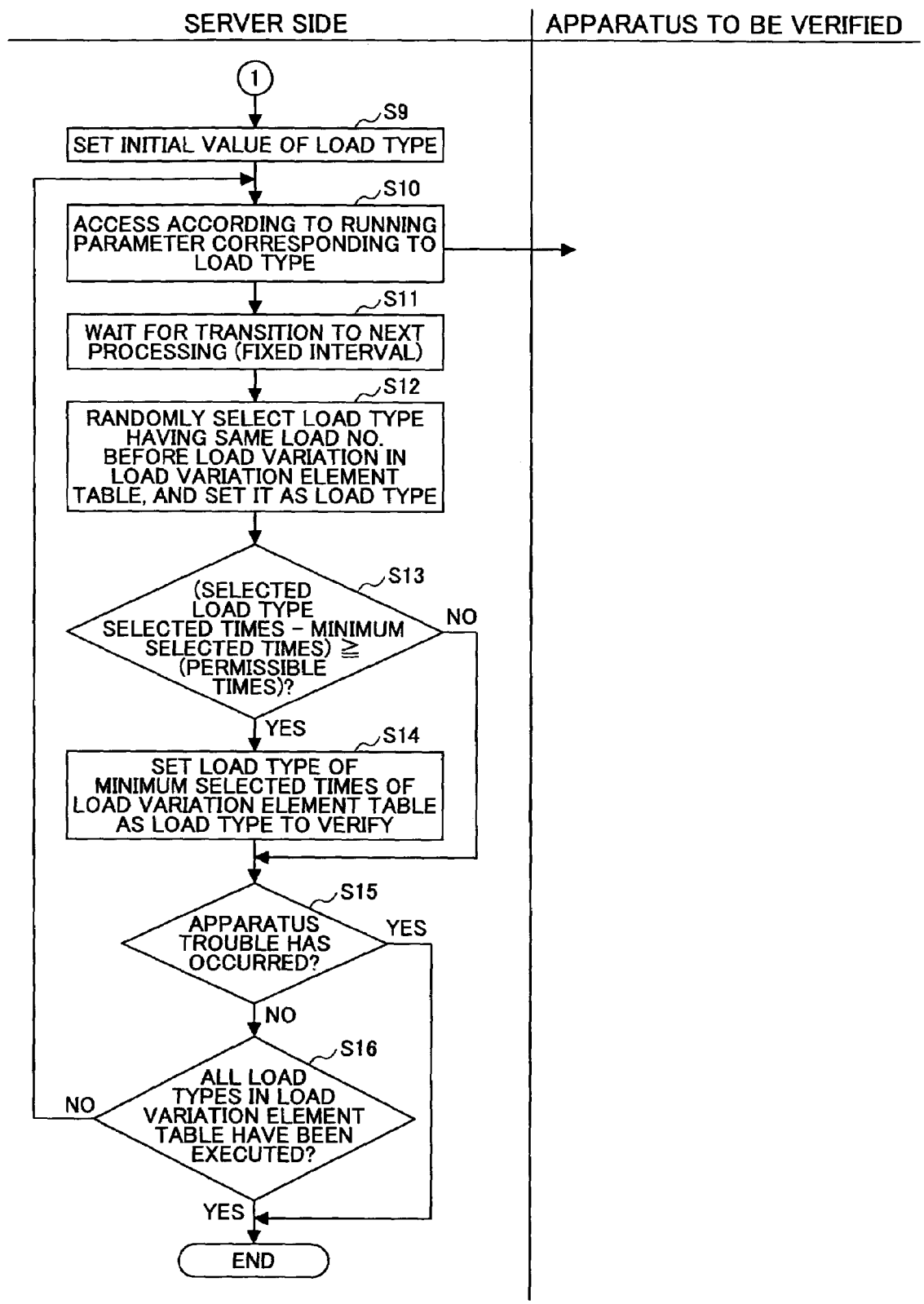

With reference to an operation flow chart shown in FIGS. 11 and 12, operation of the server 200 in the first embodiment is described.

In Step S1 of FIG. 11, base parameters such as those shown in FIG. 16, (1) are set as running parameters.

Meanings of the respective running parameters shown are shown in FIG. 10.

Further, in Step S1, predetermined initialization processing is carried out for the purpose of obtaining running parameters for a table No. 1 of a 'load type and running parameter correspondence table' shown in FIG. 17, (1) provided for determining running parameters for each particular load type.

In Step S2, the server 200 provides instructions to the disk array apparatus 100 such that collection of 'apparatus load condition value' should be started. In the disk array apparatus 100, collection of 'apparatus load condition value' is carried out (Step S21).

Figure 9:
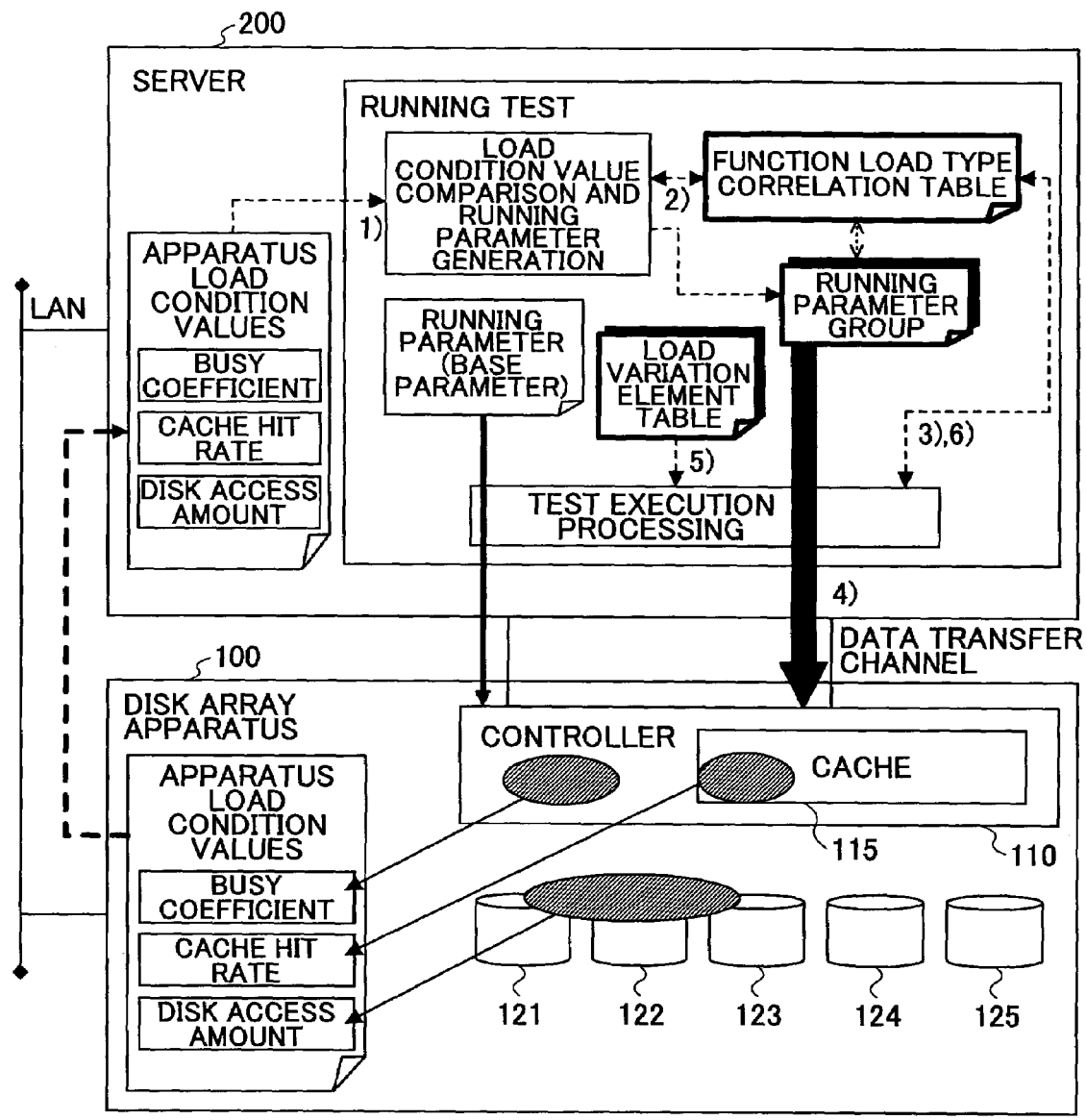
FIG. 9 illustrates an operation test of a disk array apparatus according to a second embodiment of the present invention.

As an example of the apparatus load condition value which the disk array apparatus 100 collects, a busy coefficient of the controller 110 acting as a control part of the disk array apparatus 100, a cache hit rate of a cache memory 115, disk access amounts for the magnetic disk apparatuses 121 through 124, or such may be cited (see FIG. 9).

In Step S3, the server 200 carries out access operation on the disk array apparatus 100 according to the running parameters according to the above-mentioned setting. In this occasion, the disk array apparatus 100 collects and records the apparatus load condition value in sequence (Step S22).

In Step S4, the server 100 provides instructions to the disk array apparatus 100 such that the disk array apparatus 100 should notify the server 100 of the apparatus load condition value. The server 200 obtains the apparatus load condition value notified of by the disk array apparatus 100 (Step S23).

In Step S5, the server 100 stores the currently applied running parameters in a file with a file name given thereto, and sets the file name in a running parameter name column of a table No. corresponding to the 'apparatus load condition value' obtained in Step S4, in the 'load typed and running parameter correspondence table' of FIG. 5.

This processing is described for a case where running parameters for realizing the load type of table No. 1.

First, the running parameters of FIG. 16, (1) (base parameters) are stored in a file name "parameter-A" for example.

When the apparatus load condition value obtained from the running according to the running parameters is 70% load factor (this term "load factor" is omitted hereinafter) for example, the "parameter-A" is set as the running parameter name of the table No. 2 which has a load condition value range including the apparatus load condition value obtained as mentioned above (70% is included in 61% through 80%, which is the range of the table No. 2 of FIG. 17, (2)), in the 'load type and running parameter correspondence table', as shown in FIG. 17, (2).

In Step S6, the load condition value notified of from the disk array apparatus 100 is compared with the apparatus load condition value (expected value) of the relevant table No. 1 from the load type and running parameter correspondence table.

This comparison processing is described now for an example in which, as the above-mentioned example, the load type running parameter of the table No. 1 is obtained.

When the apparatus load condition value is 70% for example, this apparatus load condition value obtained from the running does not fall within the expected value (No in Step S6) since the load factor range of the load type of the relevant table No. 1 is 81% through 100%. In this case, processing of Step S7 described below is executed.

On the other hand, when the apparatus load condition value obtained from the running is 94% for example, this value is included in the range 81% through 100% of the load factor range of the load type of the table No. 1 (Yes in Step S6). In this case, this value can be said to be effective as a running parameter for executing the table No. 1 load type. Therefore, Step S8 described below is executed.

In Step S7, a difference is obtained between the expected value of the load type of the required table No. and the load condition value obtained from the actual running, and is used as a coefficient for adjusting the values of the running parameters currently applied.

This processing is described now for an example in which, as the above-mentioned example, the table No. 1 load type running parameter is obtained.

Minimum two running parameters are obtained for executing each load type in this embodiment. When each thereof has not been determined yet, 90.5% which is an intermediate value of the load factor range 81% through 100% of the table No. 1 load type is applied as a reference value for obtaining the above-mentioned difference. On the other hand, at least one running parameter has been already obtained; the maximum value 100% of this range is applied for obtaining the difference.

When the apparatus load condition value obtained from the running is 70% for example, the coefficient is obtained as 1.29 which is the quotient obtained from dividing 90.5% by 70%. This coefficient is applied to multiply the access size and the number of queuing times which are the running parameter variation elements (see FIG. 16). As a result, the access size of 82 (kB) is obtained from 64×1.29≈82, while the number of queuing times of 10 is obtained from 10×1.29≈10.

As the access timing as another element of the running parameters, 0.77≈70 [%]/90.5 [%] is applied as a coefficient for multiplication. Specifically, this element is obtained as 0=0×0.77.

FIG. 16, (2) shows the respective elements, adjusted as described above from the base parameters shown in FIG. 16, (1).

After corresponding parameter names are given to the running parameters thus obtained from the adjustment, the procedure from Step S2 is again carried out with these running parameters. Thus, as mentioned above, the running load condition values are obtained again from the actual running.

From the apparatus load condition values obtained as a result of the respective running parameters being thus applied to the disk array apparatus 100, the relevant running parameters names are set in sequence in the column of the running parameter name of the above-mentioned load type and running parameter correspondence table (Step S5) (see FIG. 17).

In Step S8, it is determined whether or not minimum two running parameter names have been already set in each of all the table Nos. of the load type and running parameter correspondence table. When this determination result is Yes, Step S9 is executed next.

The contents of the load type and running parameter correspondence table thus determined are shown in FIG. 17, (3) for example.

When any not-yet-determined table No. exists in the load type running promoter correspondence table (FIG. 17) as a result of Step S8, Step S3 is returned to for obtaining running parameters the relevant table No.

In Step S9, before carrying out a running test applying the running parameters for each load type obtained in the above-described procedure (see FIG. 17, (3)), an initial running parameter is selected randomly (random number mod(table number+1)) from the 'load type and running parameter correspondence table', first.

It is noted that '243 mod(table number+1)' for example is a function of obtaining a remainder obtained when a random number 243 is divided by (table number+1), for example. Assuming that 243 is given as a random number and a table of FIG. 17, (3) is applied, 243 mod(table number+1)=40 with remainder 3, and thus, 3 is obtained as the relevant table No. That is, 243/(5+1)=40 with reminder 3. "Table number" means the total number of table Nos. included in the load type running parameter correspondence table shown in FIG. 17. Then, "parameter-E" which is the running parameter name registered first in the table No. 3 (see FIG. 17, (3)) is selected.

In Step S10, a running test is carried out while the thus-obtained running parameters are applied in the disk array apparatus 100.

When a load variation element of 'slight variation' is applied, a plurality of running parameters set for executing each particular load type are applied alternately in a switching manner at short intervals in an actual running test. For example, for a case of the load type of the table No. 3, the relevant parameters, i.e., "parameter-E" and "parameter-F" are applied alternately in a switching manner at short intervals during a running test.

In Step S11, after a predetermined time interval has elapsed while the disk array apparatus 100 has been made to run as mentioned above, any one of load variation Nos. having 'load Nos. before load variation' which are coincident with the load type corresponding to the running parameters currently applied is randomly selected (Step S12).

For example, when the load variation element table of FIG. 18 is applied, table Nos. 13 through 18 have the 'load Nos. before load variation' coincident with that of the table No. (that is, the above-mentioned table No. 3) currently applied. Therefore, when a value 15 is randomly determined for example, 15 is set as the load variation No. to be applied next.

In Step S13, a difference is obtained between the number of selected times for the thus-set load variation No. as an experience and the minimum value from among the respective numbers of selected times for the load Nos. having the same 'load Nos. before load variation' other than the currently set load variation No. Then, whether or not the thus-obtained deference falls within a predetermined permissible number of times. When the difference falls within the predetermined permissible number of times (No in Step S13), the thus-set load variation No. is applied as it is. In this case, the number of selected times is incremented by one for the relevant load variation No.

On the other hand, when the difference exceeds the permissible number of times (Yes in Step S13), Step S14 is executed next.

This processing is described for a case where the predetermined permissible number of times is 2 for example.

When the load variation No. 15 is selected in the state of FIG. 18, the number of selected times in the load variation No. 15 is 0, and also, the minimum value of the numbers of selected times other than No. 15 for the load variation Nos. (i.e., No. 13 through 18) having the same load type as the 'load No. before load variation' is 0. As a result, the difference to obtain is 0. Since the difference falls within the permissible number of times (2), 15 is allowed, the relevant number of selected times is incremented by 1, and then, Step S15 is executed next. FIG. 19 shows the contents of the load variation element table resulting therefrom.

On the other hand, for another example, it is assumed that the number of selected times of the load variation No. 15 is already 3 when the load variation No. 15 is selected in the state of FIG. 20, and also, the minimum value of the number of selected times (1, 0, 2, 2 and 0 for Nos. 13, 14, 16, 17 and 18, respectively) other than No. 15 having the same load type as the load No. before load variation in the load variation element table, is 0. For this case, the difference is obtained as 3=3−0. This difference at this case exceeds the permissible value 2, and thus, Step S14 is executed next.

In Step S14, the load variation Nos. having the same load type as the 'load No. before load variation' are searched from the load variation element table in the increasing order, the table having the number of selected times coincident with the minimum value is obtained, the relevant load variation No. is obtained, and is applied as a load variation element as a variation target instead of that first set in Step S12. And the number of selected times of the relevant table No. is incremented by 1.

For example, in the state of FIG. 20, when the load variation Nos. 13 through 18 are searched in the increasing order, the number of selected times of 0 in the load variation No. 14 coincides with the minimum value. Therefore, the load variation No. 14 is selected, and the number of selected times is incremented by one. FIG. 21 shows the result.

In Step S15, the running test is carried out according to the thus-set load variation elements.

Then, from test results of this running test (return codes and running logs obtained via the LAN from the disk array apparatus 100), the server 200 makes a check as to whether or not an apparatus access failure occurred during the test. Further, from the log contents which the server 200 has, it is determined whether or not a temporary apparatus access failure (a case where accessing is succeeded after re-execution) occurred.

When it is determined that any failure occurred, the running test is interrupted.

In Step S16, the above-mentioned loop of Steps S10 through 16 is repetitively carried out, and a running test is carried out for each of respective different running conditions, in sequence.

The above-mentioned second embodiment of the present invention is described now.

In the second embodiment, as shown in FIG. 9, operation verification is carried out in a state in which a server 200 acting as an operation testing apparatus for operation verification is connected with a disk array apparatus 100 having a function of collecting 'apparatus load condition value' for each function unit the disk array apparatus 100 has.

A type of interface via which the server 200 obtains 'apparatus load condition value' from the disk array apparatus 100 is not limited, and a connection form applying LAN is assumed in the embodiment the same as the first embodiment described above.

FIG. 9 shows a block diagram for carrying out an operation test, illustrating an operation testing method and apparatus according to the second embodiment.

The same as the first embodiment, the server 200 acting as the operation testing apparatus carries out access operation on the controller 110 of the disk array apparatus 100 which is the testing target, according to running parameters defining operation condition of the disk array apparatus 100. The disk array apparatus 100 responds thereto, and causes the magnetic disk apparatuses 121 through 125 to carry out relevant data processing operation, i.e., data writing/reading processing, accordingly.

During this processing, the disk array apparatus 100 obtains apparatus load condition values representing processing loads of respective function elements of the interface control function 150 with the server 200; the disk array control function 160; and the disk control function 170, and transmits the same to the server 200 in a feedback manner, via the LAN.

The server 200 receives it, compares it with a predetermined target value, and adjusts the above-mentioned running parameters when the apparatus load condition value deviates from the target value. By adjusting the running parameter, the server 200 controls the disk array apparatus 100 so that the disk array apparatus 100 may operate in the predetermined load condition.

In the second embodiment, as an example of the apparatus load condition value which represents a processing load for each of the respective ones of the interface control function 150, the disk array control function 160 and the disk control function 170 as the function elements of the disk array apparatus 100, the disk array apparatus 100 collects a cache hit rate of a cache memory 115 for the interface control function; a busy coefficient of the controller 110 acting as a control part of the disk array apparatus 100 for the disk array control function; or disk access amounts for the disk control function for the magnetic disk apparatuses 121 through 124.

Further, in the second embodiment, running, executing respective load variation elements, is carried out for each function element. As a result, running in which a relation in terms of a load factor between the respective functions is varied, and thus, a possible system failure occurring due to an inter-function related elements can be found out during the test.

Then, whether or not the disk array apparatus 100 can carry out predetermined operation properly in a condition of running in the predetermined processing load is verified.

Figure 13:
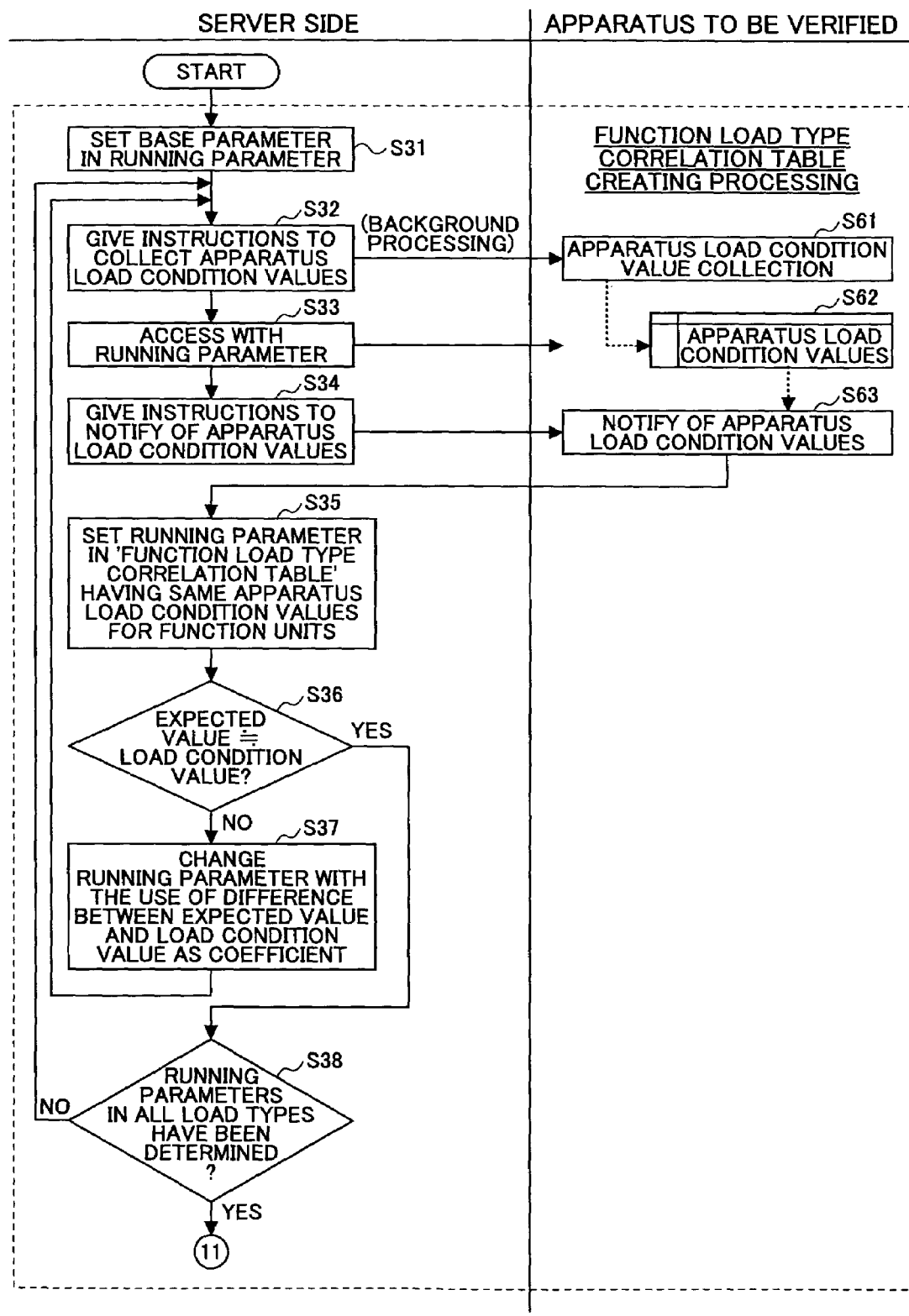
FIGS. 13, 14 and 15 show an operation flow chart of the operation test of a disk array apparatus according to the second embodiment of the present invention.
Figure 14:
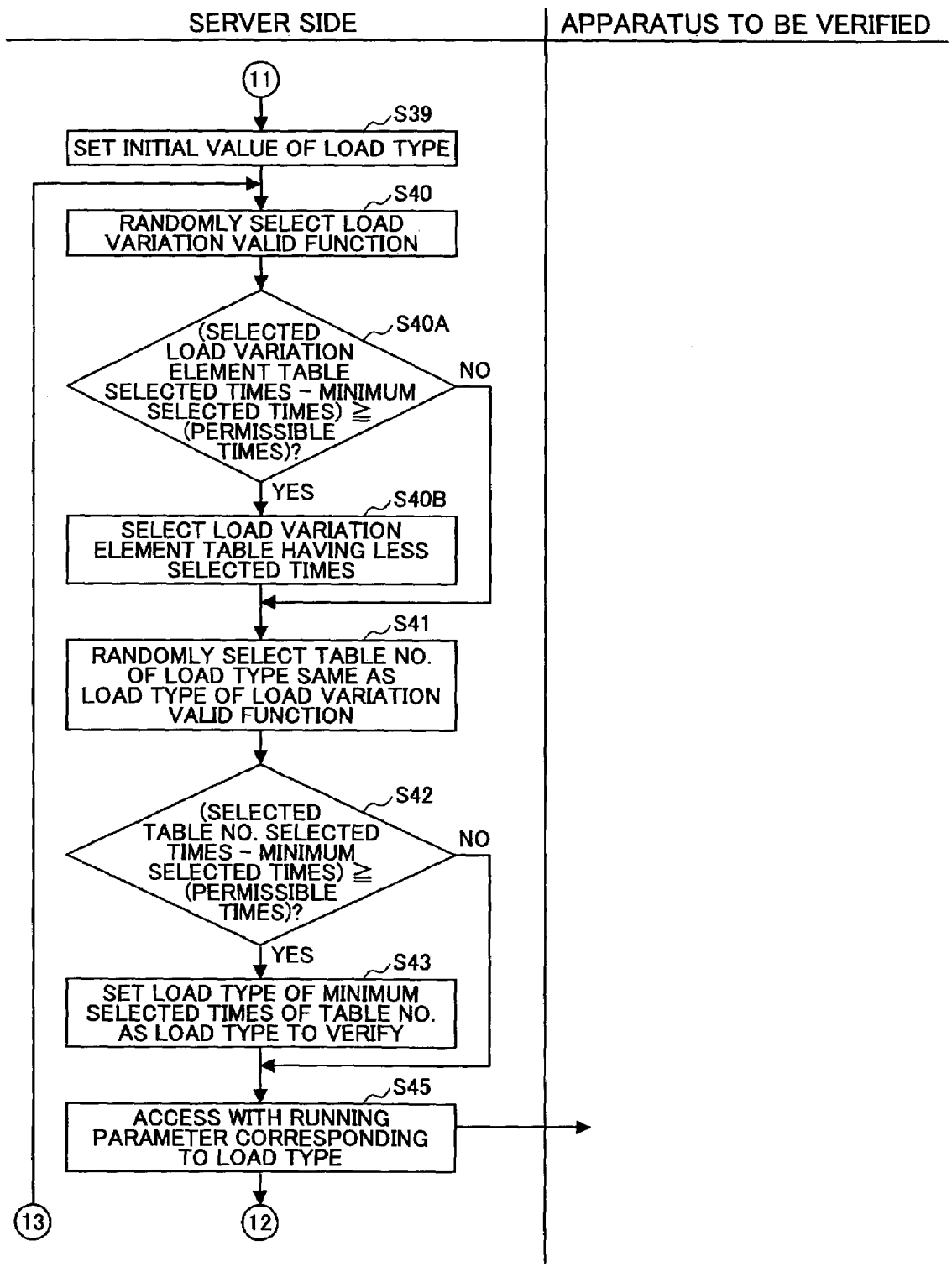
Figure 15:
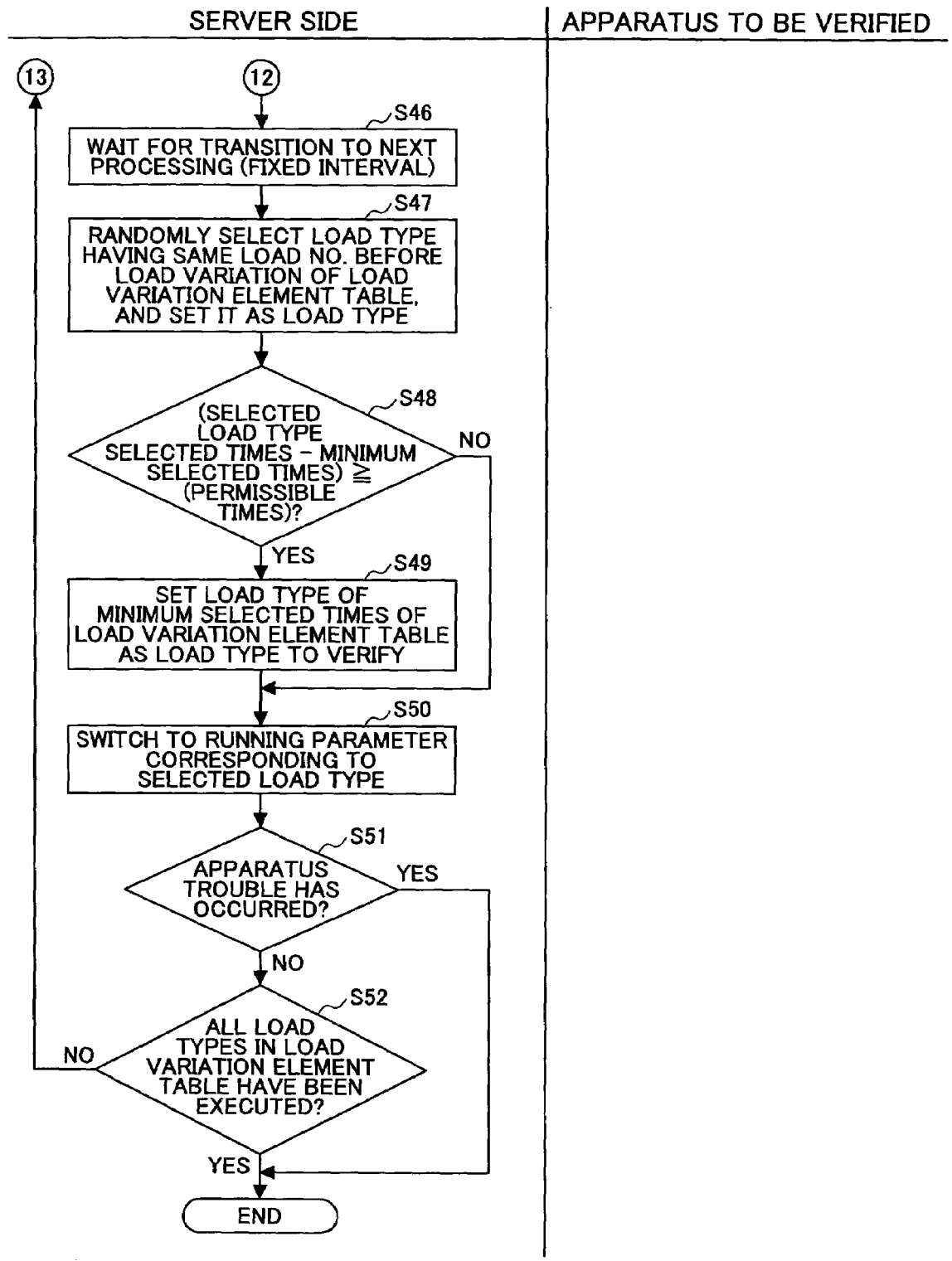

With reference to an operation flow chart of FIGS. 13 through 15, operation of the server 200 in the second embodiment is described in detail.

In Step S31, the same as the first embodiment, base parameters are set as running parameters.

Further, table No. in a function load type correlation table for determining a running parameter to apply, such as that shown in FIG. 22, is initialized in 1.

In Step S32, instructions for starting apparatus load condition value collection are sent to the disk array apparatus 100. The disk array apparatus 100 carries out apparatus load condition value collection for a function unit (Step S61).

In Step S33, access to the disk array apparatus 100 according to the running parameters (the above-mentioned base parameters or such) is carried out. During this occasion, the disk array apparatus 100 records an apparatus load condition value for the function unit (Step S62).

In Step S34, instructions for notifying of the apparatus load condition value are sent to the disk array apparatus 100 (Step S63), and the server 200 obtains the apparatus load condition value for the function unit, from the disk array apparatus 100.

In Step S35, the current running parameters are held in a file, to which a file name is given, and the file name is set in a column of a running parameter name of table No. which has a load type for the function unit, coincident with the load condition value for the function unit thus obtained from the apparatus, in the above-mentioned function load typed correlation table (FIG. 22).

When the coincident table No. does not exits, the relevant file is deleted.

This processing is described in detail for a case where a running parameter executing load combination of table No. 1 in the function load type correlation table (FIG. 22) is obtained.

For example, it is assumed that, the running parameters as the base parameters of FIG. 16, (1) are stored as a file name of "parameter-A", and the apparatus load condition value obtained from the running according to the running parameters is as follows:

That is, assuming that, as the apparatus load condition value, the server interface control load condition value: 82%; the disk array control load condition value: 95%; and the disk control load condition value: 65%, it is seen that the respective load types therefor are 1; 1; and 2, according to the load types shown in FIG. 2. As a result, the apparatus load condition values of the respective functions coincide with the load condition values of the load type of table No. 2 in FIG. 22, respectively. Accordingly, as a running parameter name for executing this load combination of table No. 2, the "parameter-A" is set. FIG. 23 shows this result.

In Step S36, the apparatus load condition values for the respective function units obtained from the disk array apparatus 100 are compared with load condition values (initial values) for the respective function units of table No. 1 (FIG. 22) for which running parameters should be obtained.

Assuming that, as mentioned above, the server interface control load value: 82%; the disk array-control load condition value: 95%; and the disk control load condition value: 65%, the serve interface load condition value and the disk array control load condition value fall within an expected ranges, respectively, while only the disk control load condition value deviates therefrom (No in Step S36). As a result, Step S37 is executed next.

That is, although the server interface control load condition value 82% and the disk array control load condition value 95% correspond to the load type 1 of FIG. 2, the disk control load condition value 65% corresponds to the load type 2. Accordingly, in comparison to the load type 1, 1 and 1 defined in table No. 1 in FIG. 23 for which table No. the running parameters should be obtained as mentioned above at this time, only the disk control load condition value deviates from the expected range.

On the other hand, if the disk control load condition value is equal to or more than 81%, the load condition values for all the functions fall within the expected range, the base parameters are determined as running parameters for this case (Yes in Step S36), and Step S38 is carried out next.

In Step S37, a sum total of differences for the respective functions are obtained between the above-mentioned expected values and the actual load condition values obtained from the running, and the running parameter values are adjusted with the use of it as a coefficient. A specific example of this adjustment operation is the same as that described above for Step S7 of the first embodiment, and duplicated description is omitted.

When the combination of load types for the respective functions for the table No. in the function load type correlation table (FIG. 22) to obtain, cannot be obtained even after several times of running parameter element adjustment operations have been carried out, an Invalid flag is set in 'valid/invalid" column for the relevant table No.

In Step S38, it is determined whether or not at least two running parameter names have been already set in each of all the table Nos. included in the 'function load type correlation table' (FIGS. 22 through 24). When a result of this determination is Yes, Step S39 is executed next.

FIG. 24 shows one example of contents in the function load type correlation table thus finally determined.

When any table No. is still left for which setting in the valid/invalid column is not made, and also, at least two running parameter names are not determined yet, Step S33 is executed, for the relevant table No. of the function load type correlation table (FIGS. 22 through 24).

When a result of the determination of Step S38 is Yes as mentioned above, an actual running test is then carried out from Step S39.

In Step S39, from the load types such as those shown in FIG. 2, one to apply as an initial load type is randomly (the same as the above, by means of a function of 'random number mod the number of load types' or such) determined.

In Step S40, a function element to apply as 'load variation valid function' is randomly ('random number mod the number of apparatus functions') determined. Here, for example, a selection is made from among the server interface control function, the disk array control function and the disk control function, to apply first for which load variation is applied first.

That is, in this example, for two of these three function elements, i.e., the server interface control function, the disk array control function and the disk control function, a load type is fixed, while, only for the other one function element, a load type is varied. The function element for which a load type is varied is refereed to as a 'load variation valid function'.

In Step S40A, a difference is obtained between the number of selected times as an experience for the thus-selected load variation valid function, and a minimum value among the numbers of selected times as experience for each of the other functions recorded, in a 'load variation element table general table' such as that shown in FIG. 25. Then, it is determined whether or not the thus-obtained difference exceeds a predetermined permissible number of times.

When the permissible number of times is exceeded (No), the function element having the minimum number of selected times is selected from the above-mentioned general table (FIG. 25), to be applied instead of the above-mentioned randomly selected function element, as the load variation valid function at this time(Step S40B). The thus-selected load variation valid function is set as a load variation valid function as a variant in the 'load variation element table general table'. After the selection, the number of selected times for the relevant function element is incremented by one.

In Step S41, in the function load type correlation table such as that of FIG. 24, any one of running parameters of table Nos. having a load type coincident with the load type determined in Step S39 is randomly (random number mod (the number of tables+1)) selected, for the function element selected as the load variation valid function at this time as mentioned above.

FIGS. 25 through 28 show the load variation element table general table, a load variation element table for the server interface control function, a load variation element table for the disk array control function and a load variation element table for the disk control function, each in an initial state, respectively. FIGS. 29 through 32 show the load variation element table general table, the load variation element table for the server interface control function, the load variation element table for the disk array control function and th load variation element table for the disk control function, respectively, each in a state after the load variation valid function is set (Step S40), and then, table No. is selected from the function load type correlation table such as that shown in FIG. 24.

In this example, the load type 1 is selected in Step S39, the disk array control function is selected in Step S40, any one of the tables Nos. 1 through 5 is selected from FIG. 24 each having the load type No. 1 for this disk array control function, and the load variation No. 3 is selected from the disk array control function load variation element table shown in FIG. 31 in Step S47 described above.

In such a case, each function element is executed in the load factor of the load type for each function element defined in the table No. thus selected from FIG. 24. At this occasion, by applying the running parameter set for the relevant table No. of FIG. 24 and the disk array apparatus is made to run therewith, each function can be executed in the load condition of the relevant load type.

Next, in Step S42, a difference is obtained between the number of selected times as experience for the table No. selected from the function load type correlation table in Step S41, and a minimum value among the numbers of selected times as experience for each of the other table Nos. having the same load type for the relevant function element. Then, it is determined whether or not the thus-obtained difference exceeds a predetermined permissible number of times. When the predetermined permissible number of times is exceeded as a result, the table No. having the above-mentioned minimum number of selected times is newly selected from the table Nos. having the same load type instead of the table No. randomly as mentioned above in Step S43.

Next, in Step S45, test running is started with the thus-selected running parameter.

When a load variation element of 'slight variation' is applied, a plurality of running parameters of the relevant table No. of the correlation table are applied alternately in a switching manner at short intervals in an actual running test.

In Step S46, after a predetermined interval has elapsed from the above-mentioned running starting while the disk array apparatus 100 has continued the running until then, any one is selected from among the load variation Nos. having the 'load Nos. before load variation' coincident with the load type corresponding to the currently applied running parameters randomly ('random number mod the number of load types'), in the 'load variation element table' corresponding to the load variation valid function, which is the variant in the 'load variation element table general table', in Step S47.

In the above-mentioned example, FIG. 27 shows the load variation element table corresponding to the function element 'disk array control function' set as the load variation valid function, and the currently applied running parameter is one set in any one of table Nos. 1 through 5 of the correction table of FIG. 24. That is, in this case, as shown, the load type for the disk array control function is No. 1. Accordingly, in FIG. 27, the load variation Nos. 1 through 6 have the 'load Nos. before load variation' coincident therewith. In Step S47, any one thereof is selected. As mentioned above, FIG. 31 shows a case where the load variation No. 3 is selected as a result as mentioned above.

In Step S48, in order to avoid deviation otherwise occurring in the thus-carried out selection of the load variation No., a difference is obtained between the number of selected times as experience for the thus-selected load variation No., and a minimum value among the numbers of selected times as experience of the respective load variation Nos. having the same 'load No. before load variation' in the relevant load variation element table. Then, when the thus-obtained difference is compared with a predetermined permissible number of times. When the difference falls within the permissible number of times (No in Step S48), the selected load variation No. is applied as it is (Step S50). In this case, the number of selected times of the load variation No. is incremented by one, and Step S50 is executed.

On the other hand, when the dereference exceeds the permissible number of times (Yes in Step S48), Step S49 is executed next.

In Step S49, the load variation Nos. having the same load type as the 'load No. before load variation' are searched from the load variation element table in the increasing order, the table having the number of selected times coincident with the minimum value is obtained, the relevant load variation No. is selected, and is applied as a load variation element as a variation target instead of that set in Step S47. And the number of selected times of the relevant table No. is incremented by 1.

In Step 50, running parameters corresponding to the thus-selected load variation No. is selected from the function load type correlation table such as that of FIG. 24. Then, the thus-obtained running parameters are applied and a test running is switched therewith.

When the load No. 3 is selected from FIG. 31 for example as mentioned above, the 'load No. after load variation' in this load variation No. is 2. In this case, in the correlation table of FIG. 24, for the disk array control function, table Nos. starting from table No. 6 have the load type coincident with the load type corresponding to the above-mentioned load No. 2. Accordingly, in Step S50, any table No. is selected from the table Nos. starting from No. 6 of FIG. 24, and each function applying running parameters registered in this table No. is then executed.

In Step S51, from test results (return codes and running logs) of the thus-carried out running test, the server 200 makes a check as to whether or not an apparatus access failure occurred there. Further, from the log contents which the server 200 has, it is determined whether or not any temporary apparatus access failure (a case where accessing is succeeded after re-execution) occurred. When it is determined that any failure occurred, the running test is interrupted.

In Step S52, a load variation running test, applying a load pattern which may be different for each particular function, is carried out, in sequence, by repeating Steps S40 through S51.

Figure 33:
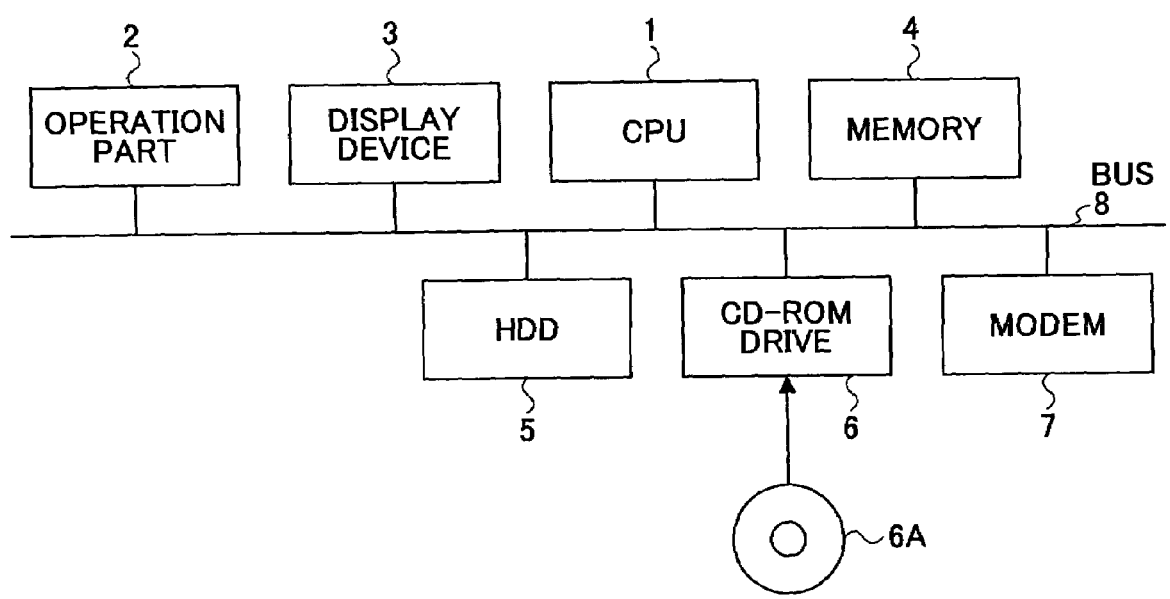
FIG. 33 shows an example in which a server in an embodiment of the present invention is configured by a computer.

FIG. 33 shows a hardware configuration example or the server 200 shown in FIG. 8 or 9.

As shown, the server in this example is made of a computer, which has a CPU 1, a display 3, an operation part 2, a memory 4, a hard disk drive 5, a CD-ROM drive 6, a modem 7 and a bus 8 mutually connecting them so as to make data communication possible thereamong.

In this case, a program including instructions for causing the computer to execute the procedure described above with reference to FIGS. 11–12 or FIGS. 13–15 in the first or second embodiment of the present invention is produced, and is then installed in the hard-disk drive 5 with the use of a CD-ROM 6A or downloaded via a communication network such as the Internet, a LAN or such.

After that, the CPU 1 reads the respective instructions thereof, and execute the same with the use of the memory 4. As a result, an operation testing method according to each embodiment of the present invention can be carried out.

Further, the present invention is not limited to the above-described embodiments, and, variations and modifications may be made without departing from the basic idea of the present invention claimed below.

The present application is based on Japanese priority application No. 2005-096279, filed on Mar. 29, 2005, the entire contents of which are hereby incorporated herein by reference.

What is claimed is:

1. An operation testing method, comprising:
a processing operation execution step of causing a processing apparatus to be tested to carry out a predetermined processing operation in a predetermined processing condition;
a processing load factor measurement step of measuring a processing load factor in the processing apparatus for when the predetermined processing operation is carried out in the processing apparatus;
a processing load factor comparison step of comparing the measured processing load factor with a predetermined target processing load factor range;
a processing condition adjustment step of adjusting the predetermined processing condition such that the measured processing load factor falls within the predetermined target processing load factor range; and
an operation verification step of carrying out operation verification of the apparatus in a condition where the measured processing load factor falls within the target processing load factor range, and wherein:
the processing operation execution step, the processing load factor measurement step, the processing load factor comparison step, the processing condition adjustment step, and the operation verification step are repeated while the target processing load factor range is changed in a predetermined manner.

2. The operation testing method as claimed in claim 1, wherein:
said processing apparatus has a plurality of functions; and
the processing operation execution step, the processing load factor measurement step, the processing load factor comparison step, the processing condition adjustment step, and the operation verification step are repeated while the target processing load factor range is changed in a predetermined manner, for a processing operation concerning each of the plurality of functions.

3. The operation testing method as claimed in claim 1, wherein:
said processing apparatus comprises a disk array apparatus having a plurality of magnetic disk apparatuses, and having a function of managing storage areas thereof in an integrated manner.

4. The operation testing method as claimed in claim 2, wherein:
said processing apparatus comprises a disk array apparatus having a plurality of magnetic disk apparatuses, and having a function of managing storage areas thereof in an integrated manner; and
said plurality of functions comprise at least one of a function concerning a control of an interface with a server, for when an access operation is carried out to the disk array apparatus by the server, a function concerning the integrated management of the plurality of disk apparatuses, and a function concerning a control of each particular magnetic disk apparatus.

5. The operation testing method as claimed in claim 3, wherein:
said processing load factor comprises at least one of a busy coefficient of a control part of the disk array apparatus, a cache hit rate of a cache memory, and an access amount to the magnetic disk apparatus.

6. An operation testing apparatus, comprising:
a processing operation execution part causing a processing apparatus to be tested to carry out a predetermined processing operation in a predetermined processing condition;
a processing load factor measurement part measuring a processing load factor in the processing apparatus for when the predetermined processing operation is carried out in the processing apparatus;
a processing load factor comparison step of comparing the measured load factor with a predetermined target processing load factor range;
a processing condition adjustment part adjusting the predetermined processing condition in such a manner that the measured processing load factor falls within the predetermined target processing load factor range; and
an operation verification part carrying out operation verification of the apparatus in a condition where the measured processing load factor falls within the target processing load factor range, and wherein:
execution of the predetermined processing by the processing operation execution part, measurement of the predetermined processing load factor by the processing load factor measurement part, comparison of the processing load factor by the processing load factor comparison part, adjustment of the predetermined condition by the processing condition adjustment part, and operation verification by the operation verification part are repeated while the target processing load factor range is changed in a predetermined manner.

7. The operation testing apparatus as claimed in claim 6, wherein:
said processing apparatus has a plurality of functions; and
execution of the predetermined processing by the processing operation execution part, measurement of the predetermined processing load factor by the processing load factor measurement part, comparison of the processing load factor by the processing load factor comparison part, adjustment of the predetermined condition by the processing condition adjustment part, and operation verification by the operation verification part are repeated while the target processing load factor range is changed in a predetermined manner, for a processing operation concerning each of the plurality of functions.

8. The operation testing apparatus as claimed in claim 6, wherein:
said processing apparatus comprises a disk array apparatus having a plurality of magnetic disk apparatuses, and having a function of managing storage areas thereof in an integrated manner.

9. The operation testing apparatus as claimed in claim 7, wherein:
said processing apparatus comprises a disk array apparatus having a plurality of magnetic disk apparatuses and having a function of managing storage areas thereof in an integrated manner; and
said plurality of functions comprise at least one of a function concerning a control of an interface with a server for when an access operation is carried out to the disk array apparatus by the server; a function concerning the integrated management of the plurality of disk apparatuses; and a function concerning a control of each particular magnetic disk apparatus.

10. The operation testing method as claimed in claim 8, wherein:
said processing load factor comprises at least one of a busy coefficient of a control part of the disk array apparatus, a cache hit rate of a cache memory, and an access amount to the magnetic disk apparatus.

11. A computer readable information recording medium storing a program readable by the computer for causing the computer to execute operation testing of a processing apparatus to be tested, and comprising instructions for causing the computer to execute:
a processing operation execution step of causing a processing apparatus to be tested to execute a predetermined processing operation in a predetermined processing condition;
a processing load factor measurement step of measuring a processing load factor in the processing apparatus for when the predetermined processing operation is carried out in the processing apparatus;
a processing load factor comparison step of comparing the measured processing load factor with a predetermined target processing load factor range;
a processing condition adjustment step of adjusting the predetermined processing condition such that the measured processing load factor falls within the predetermined target processing load factor range; and
an operation verification step of carrying out operation verification of the apparatus in a condition where the measured processing load factor falls within the target processing load factor range, and wherein:
the processing operation execution step, the processing load factor measurement step, the processing load factor comparison step, the processing condition adjustment step, and the operation verification step are repeated while the target processing load factor range is changed in a predetermined manner.

12. The computer readable information recording medium as claimed in claim 11, storing the program for causing the computer to carry out the operation testing for the processing apparatus having a plurality of functions, wherein:
in the operation testing, the processing operation execution step, the processing load factor measurement step, the processing load factor comparison step, the processing condition adjustment step, and the operation verification step are repeated while the target processing load factor range is changed in a predetermined manner, for a processing operation concerning each of the plurality of functions.

13. The computer readable information recording medium as claimed in claim 11, further comprising storing the program for causing the computer to carry out the operation testing of the processing apparatus which comprises a disk array apparatus having a plurality of magnetic disk apparatuses, and having a function of managing storage areas thereof in an integrated manner.

14. The computer readable information recording medium as claimed in claim 13, storing the program for causing the computer to carry out the operation testing of the processing apparatus which comprises a disk array apparatus having a plurality of magnetic disk apparatuses, and having a function of managing storage areas thereof in an integrated manner; wherein:
in the operation testing, said plurality of functions comprise at least one of a function concerning a control of an interface with a server for when an access operation is carried out to the disk array apparatus by the server, a function concerning the integrated management of the plurality of disk apparatuses; and a function concerning a control of each particular magnetic disk apparatus.

15. The computer readable information recording medium as claimed in claim 13, further comprising storing the program for causing the computer to carry out the operation testing, wherein:
said processing load factor comprises at least one of a busy coefficient of a control part of the disk array apparatus, a cache hit rate of a cache memory, and an access amount to the magnetic disk apparatus.

* * * * *